US008573525B2

(12) United States Patent  (10) Patent No.: US 8,573,525 B2
Mori  (45) Date of Patent: Nov. 5, 2013

(54) REEL INSTALLATION METHOD AND MAGAZINE

(71) Applicant: Fujifilm Corporation, Tokyo (JP)

(72) Inventor: Yasuhiro Mori, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/738,985

(22) Filed: Jan. 10, 2013

(65) Prior Publication Data

US 2013/0117984 A1  May 16, 2013

Related U.S. Application Data

(63) Continuation of application No. PCT/JP2011/063177, filed on Jun. 8, 2011.

(30) Foreign Application Priority Data

Jul. 30, 2010 (JP) ................................. 2010-172793
Mar. 3, 2011 (JP) ................................. 2011-046699

(51) Int. Cl.
  *G11B 15/32* (2006.01)
(52) U.S. Cl.
  USPC .......................................... 242/341; 242/352
(58) Field of Classification Search
  USPC ........... 242/341, 349, 352, 352.3, 352.1, 335, 242/336
  See application file for complete search history.

(56) References Cited

U.S. PATENT DOCUMENTS

| 373,261 A | * | 11/1887 | Allen | 242/611 |
| 1,379,408 A | * | 5/1921 | Holden | 403/261 |
| 3,739,998 A | * | 6/1973 | Esashi et al. | 242/340 |
| 5,014,141 A | * | 5/1991 | Gervais et al. | 242/352.1 |
| 5,028,012 A | * | 7/1991 | Kita | 242/548.4 |
| 6,386,470 B1 | * | 5/2002 | Vanderheyden | 242/332.7 |
| 6,491,247 B2 | * | 12/2002 | Huettenegger | 242/342 |
| 6,676,055 B1 | * | 1/2004 | Martin | 242/340 |

FOREIGN PATENT DOCUMENTS

| JP | 8-235821 A | 9/1996 |
| JP | 11-208080 A | 8/1999 |
| JP | 2000-100115 A | 4/2000 |
| JP | 2010-79989 A | 4/2010 |

OTHER PUBLICATIONS

Written Opinion of the ISA issued in International Application No. PCT/JP2011/063177 on Jun. 8, 2011.
International Search Report issued in International Application No. PCT/JP2011/063177 on Jun. 8, 2011.

* cited by examiner

*Primary Examiner* — William A Rivera
(74) *Attorney, Agent, or Firm* — SOLARIS Intellectual Property Group, PLLC

(57) ABSTRACT

An installation method includes: holding a first reel and a second reel at an upper cartridge so as to be unable to rotate, by reel holding mechanisms; detaching a lower cartridge from the upper cartridge; conveying the upper cartridge, that is in a state of holding the first reel and the second reel by the reel holding mechanisms, to a drive device, and positioning and placing the first reel and the second reel respectively on a pair of rotating members of the drive device; releasing holding of the first reel and the second reel by the reel holding mechanisms; removing the upper cartridge from the drive device; and fixing the first reel and the second reel to the respective rotating members.

4 Claims, 27 Drawing Sheets

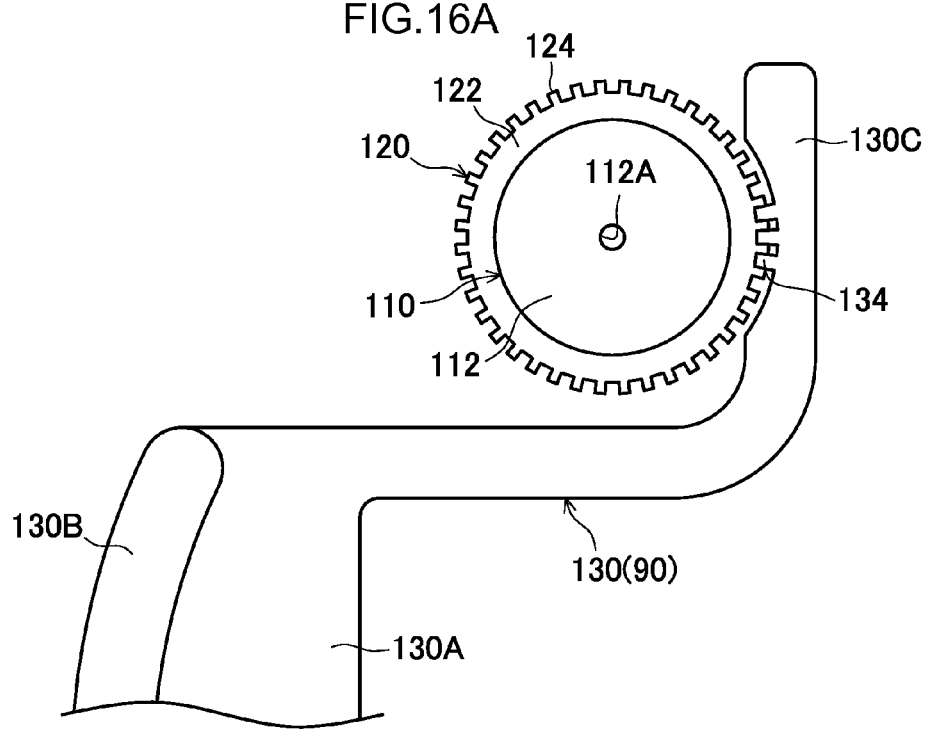
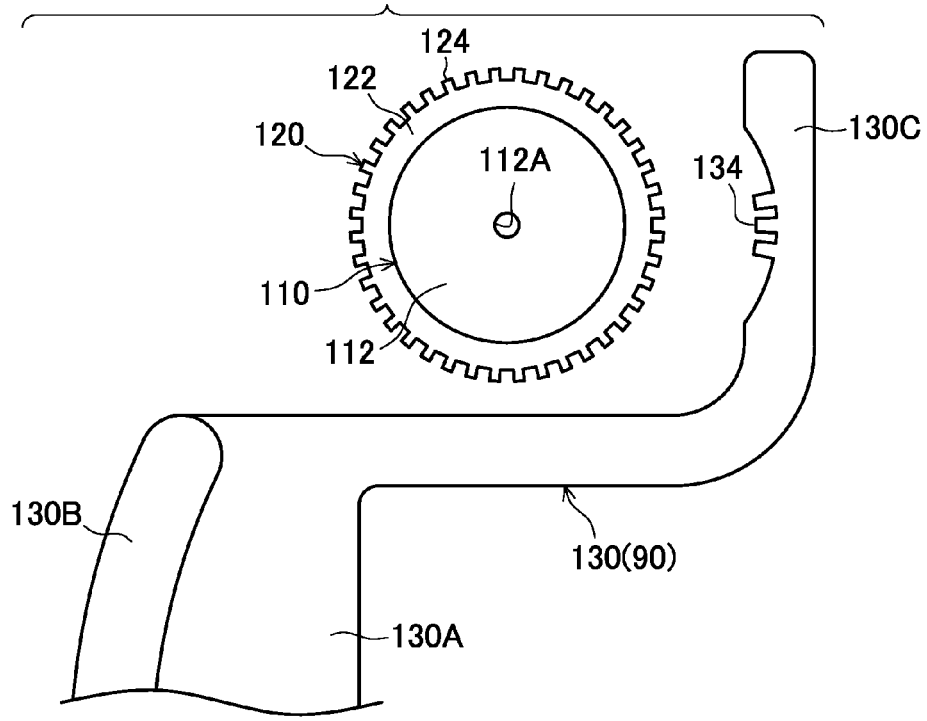

REEL INSTALLATION METHOD AND MAGAZINE

CROSS-REFERENCE TO RELATED APPLICATION

This application is a continuation application of International Application No. PCT/JP2011/063177, filed Jun. 8, 2011, which is incorporated herein by reference. Further, this application claims priority from Japanese Patent Application No. 2010-172793, filed Jul. 30, 2010, and Japanese Patent Application No. 2011-046699, filed Mar. 3, 2011, which are incorporated herein by reference.

BACKGROUND

1. Technical Field

The present invention relates to a method of irremovably installing a pair of reels into a drive device, and to a magazine in which the reels are housed.

2. Related Art

There are conventionally known recording tape cartridges in which a recording tape, such as a magnetic tape or the like that is used as an information recording/playback medium (data backup) mainly of computers or the like, is wound on a reel, and the reel is singly accommodated within a case (see, for example, Japanese Patent Application Laid-Open (JP-A) No. 2010-79989).

When this recording tape cartridge is loaded into a drive device, the recording tape is pulled-out from the reel, and is taken-up onto a take-up reel of the drive device. Then, writing or reading of information is carried out on this recording tape by a recording/playback head of the drive device.

SUMMARY

However, in such a system, because the recording tape cartridge is removable with respect to the drive device, security measures are needed with respect to the recording tape cartridge (the information recorded on the recording tape). To this end, it has been thought to provide the reel directly within the drive device and make it such that the reel cannot be removed, but, in this case, there is the need to ensure the ability to install a pair of reels into the drive device.

Thus, in view of the above-described circumstances, an object of the present invention is to provide a reel installation method that can ensure the ability to install, into a drive device, a pair of reels that are to be installed into a drive device, and a magazine in which the reels are housed.

In order to achieve the above-described object, a reel installation method of a first aspect relating to the present invention is an installation method for installing a first reel and a second reel into a drive device from a magazine that is formed from an upper cartridge and a lower cartridge that is detachable from the upper cartridge, and that houses the first reel and the second reel that each have a reel hub, and houses a recording tape that is wound on an outer peripheral surface of at least one reel hub of the first reel or the second reel, the method comprising: (A) holding the reel hub of the first reel and the reel hub of the second reel at the upper cartridge so as to be unable to rotate, by reel holding mechanisms that are provided at the upper cartridge; (B) detaching the lower cartridge from the upper cartridge; (C) conveying the upper cartridge, that is in a state of holding the respective reel hubs of the first reel and the second reel by the reel holding mechanisms, to the drive device, and positioning and placing the reel hub of the first reel and the reel hub of the second reel respectively on a pair of rotating members of the drive device; (D) releasing holding of the respective reel hubs of the first reel and the second reel by the reel holding mechanisms; (E) removing the upper cartridge from the drive device; and (F) fixing the respective reel hubs of the first reel and the second reel to the respective rotating members of the drive device.

In accordance with the above-described aspect, the ability to install the first reel and the second reel, that are to be installed in a drive device, into the drive device can be ensured.

Further, a reel installation method of a second aspect relating to the present invention is the reel installation method of the above-described aspect wherein, at a time of (C) conveying the upper cartridge, that is in a state of holding the respective reel hubs of the first reel and the second reel by the reel holding mechanisms, to the drive device, and positioning and placing the reel hub of the first reel and the reel hub of the second reel respectively on the pair of rotating members of the drive device, engaging portions of the drive device are made to engage with engaged portions that are formed at the upper cartridge.

In accordance with the above-described aspect, the positioning and placing of the first reel and the second reel on the pair of rotating members of the drive device can be accomplished easily.

Further, a reel installation method of a third aspect relating to the present invention is the reel installation method of the above-described aspect, wherein the recording tape is guided by temporary guides that are provided at the upper cartridge, and, at a time of (C) conveying the upper cartridge, that is in a state of holding the respective reel hubs of the first reel and the second reel by the reel holding mechanisms, to the drive device, and positioning and placing the reel hub of the first reel and the reel hub of the second reel respectively on the pair of rotating members of the drive device or (D) releasing holding of the respective reel hubs of the first reel and the second reel by the reel holding mechanisms, the recording tape, that is guided by the temporary guides, is transferred to actual guides of the drive device.

In accordance with the above-described aspect, the ability to install the first reel and the second reel into the drive device can be improved.

Further, a reel installation method of a fourth aspect relating to the present invention is the reel installation method of the above-described aspect, wherein flanges are provided respectively at both end portions of the reel hub of the first reel and both end portions of the reel hub of the second reel, and, when the first reel and the second reel are housed in the magazine, at least the flanges do not contact inner surfaces of the magazine.

In accordance with the above-described aspect, at times of conveying the magazine, and the like, there is no concern that the flanges will deform due to the inner surfaces of this magazine. Accordingly, there is no concern that the transverse direction both end portions of the recording tape will be damaged.

Further, a magazine of a fifth aspect relating to the present invention comprises: a first reel and a second reel that each have a reel hub; a recording tape that is wound on an outer peripheral surface of at least one reel hub of the first reel or the second reel; an upper cartridge that, at a time of installation into a drive device, positions the first reel and the second reel such that the reel hub of the first reel is placed at a first installation position of the drive device and the reel hub of the second reel is placed at a second installation position of the drive device; and reel holding mechanisms that are provided at the upper cartridge, and that, in a state in which the reel hub of the first reel and the reel hub of the second reel are respectively positioned at the upper cartridge, hold the reel hub of the first reel and the reel hub of the second reel at the upper cartridge so as to be unable to rotate.

In accordance with the above-described aspect, because the first reel and the second reel, that are to be installed into a drive device, are installed in a state of being positioned and held at the upper cartridge, the ability to install the first reel and the second reel into a drive device can be ensured.

Further, a magazine of a sixth aspect relating to the present invention is the magazine of the above-described aspect wherein the reel holding mechanisms have: a first rotational position prescribing member that is mounted to the reel hub of the first reel so as to rotate integrally therewith; a second rotational position prescribing member that is mounted to the reel hub of the second reel so as to rotate integrally therewith; and a locking member that locks the first rotational position prescribing member and the second rotational position prescribing member so as to be unable to rotate.

In accordance with the above-described structure, at times of conveying the magazine, and the like, the first reel and the second reel inadvertently rotating can be impeded reliably.

Further, a magazine of a seventh aspect relating to the present invention is the magazine of the above-described aspect wherein the locking member has temporary guides that guide the recording tape, the magazine is structured such that the upper cartridge is installed in the drive device, locking of the locking member with respect to the first rotational position prescribing member and the second rotational position prescribing member is released, the temporary guides are withdrawn from the recording tape, and due thereto, the recording tape becomes able to be transferred to actual guides of the drive device.

In accordance with the above-described structure, the ability to install the first reel and the second reel into a drive device can be improved.

Further, a magazine of an eighth aspect relating to the present invention is the magazine of the above-described aspect comprising: a lower cartridge that is structured so as to be able to open a lower portion of the upper cartridge, and that, together with the upper cartridge, houses the first reel and the second reel, wherein, due to the temporary guides being held at guide holding portions that are provided at the lower cartridge, the locking member is fixed at a locking position with respect to the first rotational position prescribing member and the second rotational position prescribing member.

In accordance with the above-described aspect, locking of rotation with respect to the first reel and the second reel can be accomplished simply.

Further, a magazine of a ninth aspect relating to the present invention is the magazine of the above-described aspect wherein the locking member is structured so as to be able to be detached after the temporary guides are withdrawn from the recording tape and the recording tape is transferred to the actual guides of the drive device.

In accordance with the above-described aspect, it can be made such that the locking member does not get in the way of the work after the recording tape is transferred from the temporary guides to the actual guides of the drive device.

Further, a magazine of a tenth aspect relating to the present invention is the magazine of the above-described aspect comprising: a lower cartridge that is structured so as to be able to open a lower portion of the upper cartridge, and that, together with the upper cartridge, houses the first reel and the second reel, wherein flanges are provided respectively at both end portions of the reel hub of the first reel and both end portions of the reel hub of the second reel, and, so that the flanges do not contact inner surfaces of the upper cartridge and inner surfaces of the lower cartridge, the reel holding mechanisms have a first vertical position prescribing member that prescribes a position in a vertical direction of the reel hub of the first reel, and a second vertical position prescribing member that prescribes a position in the vertical direction of the reel hub of the second reel.

In accordance with the above-described aspect, at times of conveying the magazine, and the like, there is no concern that the flanges will deform due to the inner surfaces of the upper cartridge or the inner surfaces of the lower cartridge. Accordingly, there is no concern that the transverse direction both end portions of the recording tape will be damaged.

Further, a magazine of an eleventh aspect relating to the present invention is the magazine of the above-described aspect wherein the first vertical position prescribing member and the second vertical position prescribing member are structured so as to, by being rotated in one direction, assume holding states in which the first vertical position prescribing member and the second vertical position prescribing member prescribe the positions in the vertical direction of the respective reel hubs of the first reel and the second reel, and, by being rotated in the one direction or another direction, assume holding releasing states in which the first vertical position prescribing member and the second vertical position prescribing member release prescribing of the positions in the vertical direction of the respective reel hubs.

In accordance with the above-described aspect, the positions in the vertical direction of the first reel and the second reel can be prescribed simply.

Further, a magazine of a twelfth aspect relating to the present invention is the magazine of the above-described aspect wherein magnetic metals are provided at inner peripheral surface sides of the respective reel hubs of the first reel and the second reel, and the first vertical position prescribing member and the second vertical position prescribing member are structured so as to, by attracting the magnetic metals of the respective reel hubs by magnetic force, assume holding states in which the first vertical position prescribing member and the second vertical position prescribing member prescribe the positions in the vertical direction of the respective reel hubs, and, by releasing attraction of the magnetic metals of the respective reel hubs by magnetic force, assume holding releasing states in which the first vertical position prescribing member and the second vertical position prescribing member release prescribing of the positions in the vertical direction of the respective reel hubs.

In accordance with the above-described aspect, the positions in the vertical direction of the first reel and the second reel can be prescribed simply.

Further, a magazine of a thirteenth aspect relating to the present invention is the magazine of the above-described aspect wherein the upper cartridge has engaged portions that engage with engaging portions provided at the drive device, and that position the first reel and the second reel respectively with respect to the first installation position and the second installation position of the drive device.

In accordance with the above-described aspect, the positioning and placing of the first reel and the second reel at the respective installation positions of the drive device can be accomplished easily.

Further, a magazine of a fourteenth aspect relating to the present invention is the magazine of the above-described aspect wherein rotating members are disposed at the first installation position and the second installation position respectively, and positioning portions, that prescribe positions in a peripheral direction of the reel hubs with respect to the rotating members, are structured by convex portions that are formed at either one of the reel hubs and the rotating members, and concave portions that are formed at either other of the reel hubs and the rotating members and are fit-together with the convex portions.

In accordance with the above-described aspect, the positions, in the peripheral direction, of the respective reel hubs of the first reel and the second reel can be positioned with respect to the rotating members of the drive device. Due thereto, making the positions of the screw hole portions that are provided at the respective reel hubs, and the positions of the screw boss portions that are provided at the rotating members, coincide can be accomplished easily.

Further, a magazine of a fifteenth aspect relating to the present invention is the magazine of the above-described aspect comprising: a lower cartridge that is structured so as to be able to open a lower portion of the upper cartridge, and that, together with the upper cartridge, houses the first reel and the second reel, wherein the lower cartridge is a structure that supports the first reel and the second reel by being fixed to the upper cartridge by fasteners provided at the upper cartridge side.

In accordance with the above-described aspect, the first reel and the second reel that are held at the upper cartridge can be fixed at the magazine interior.

ADVANTAGEOUS EFFECTS OF INVENTION

As described above, in accordance with the present invention, there can be provided a reel installation method that can ensure the ability to install, into a drive device, a pair of reels that are to be installed into a drive device, and a magazine in which these reels are housed.

BRIEF DESCRIPTION OF THE DRAWINGS

Exemplary embodiments of the present invention will be described in detail based on the following figures, wherein:

FIG. 16A is a plan view showing a meshing structure of a lock gear of the locking member and an engaging gear of the rotational position prescribing member.

FIG. 16B is a plan view showing the meshing structure of the lock gear of the locking member and the engaging gear of the rotational position prescribing member.

DETAILED DESCRIPTION

Embodiments relating to the present invention are described in detail hereinafter on the basis of the drawings. Note that, for convenience of explanation, arrow UP in FIG. 1, FIG. 2 is the upward direction and arrow DO is the downward direction, and the rotation axial directions of a reel 10 that serves as a first reel relating to the present embodiment and a reel 20 that serves as a second reel is the vertical direction (height direction).

Figure 1:
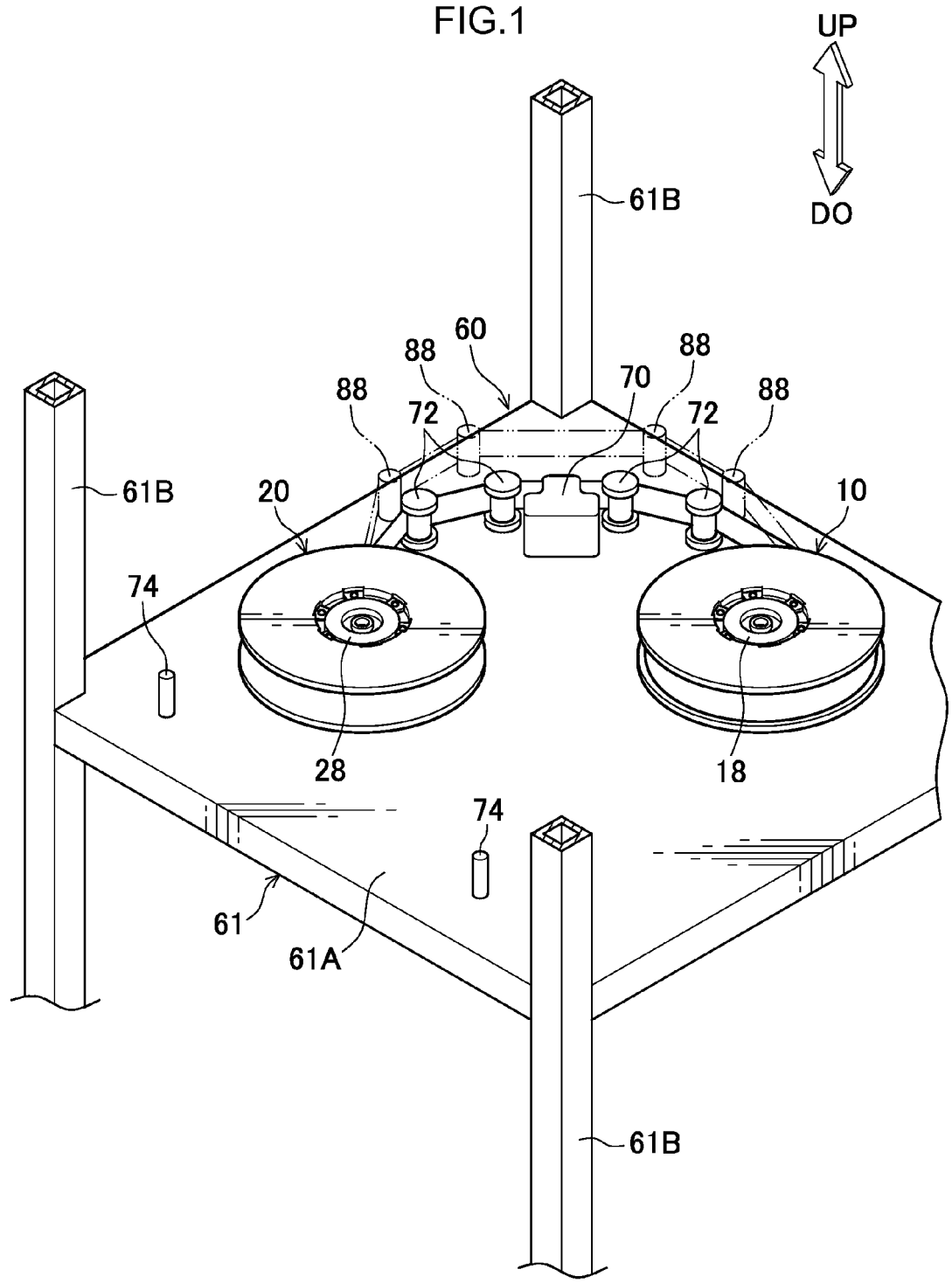
FIG. 1 is a perspective view showing a drive device in which reels are installed.
Figure 2:
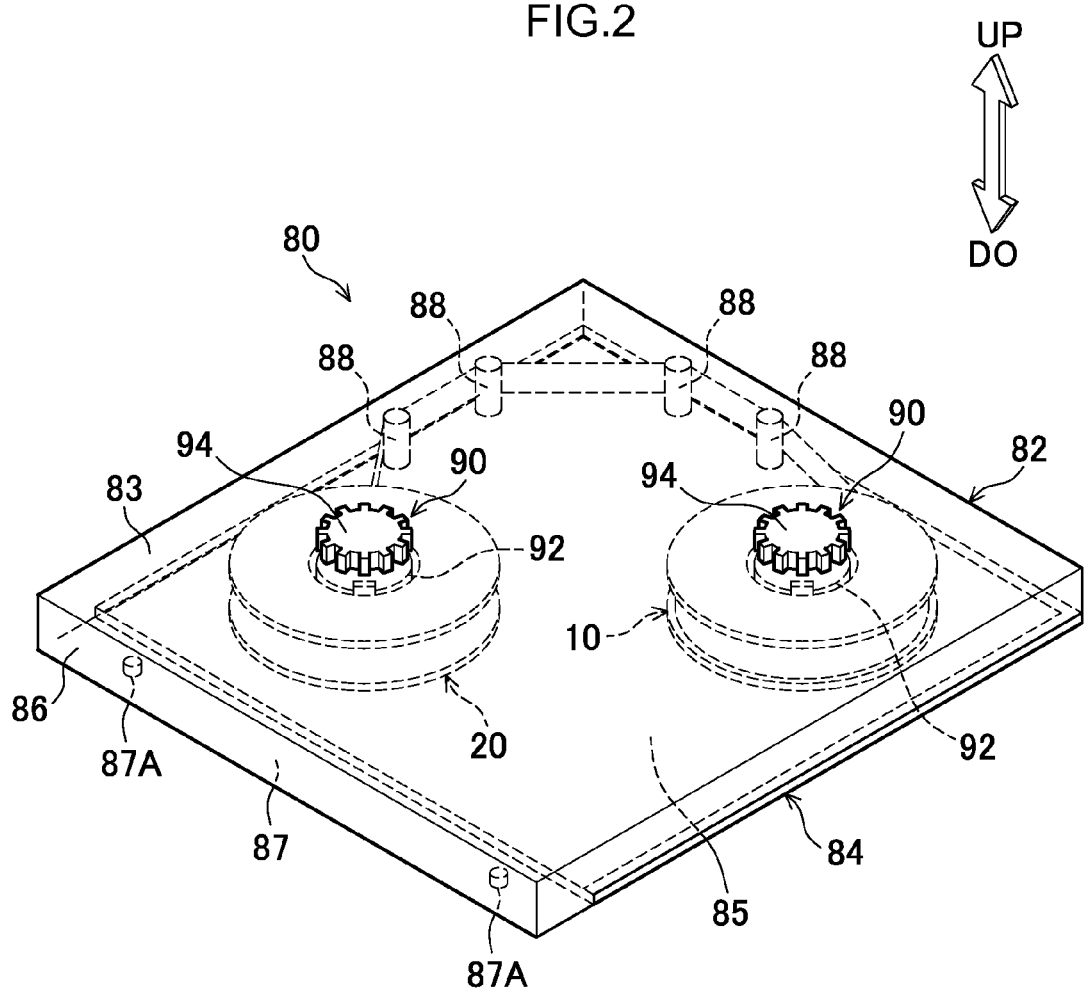
FIG. 2 is a perspective view in a case of viewing a magazine relating to a first embodiment from above.

The reels 10, 20 relating to the present embodiment are made of a synthetic resin such as, for example, polycarbonate (PC) or the like, and, as shown in FIG. 1, are provided as a pair within a housing 61 (in FIG. 1, only a bottom plate 61A and three supporting pillars 61B are illustrated) of a drive device 60.

Namely, the reel 10 is for drawing-out of a recording tape T that is described later, and the reel 20 is for taking-up of the recording tape T that is described later, and the recording tape T that is drawn-out from the reel 10 slidingly contacts a recording/playback head 70 while being taken-up onto the reel 20. Namely, by this recording/playback head 70, data is recorded onto this recording tape T, and data recorded on this recording tape T is played-back.

Note that plural (in the illustrated structure, two each for a total of four) tape guides (actual guides) 72 are provided so as to rotate freely at the bottom plate 61A at both sides of the recording/playback head 70. The recording tape T, that is pulled-out from the reel 10 and is taken-up onto the reel 20, is guided by the respective tape guides 72.

Figure 3:
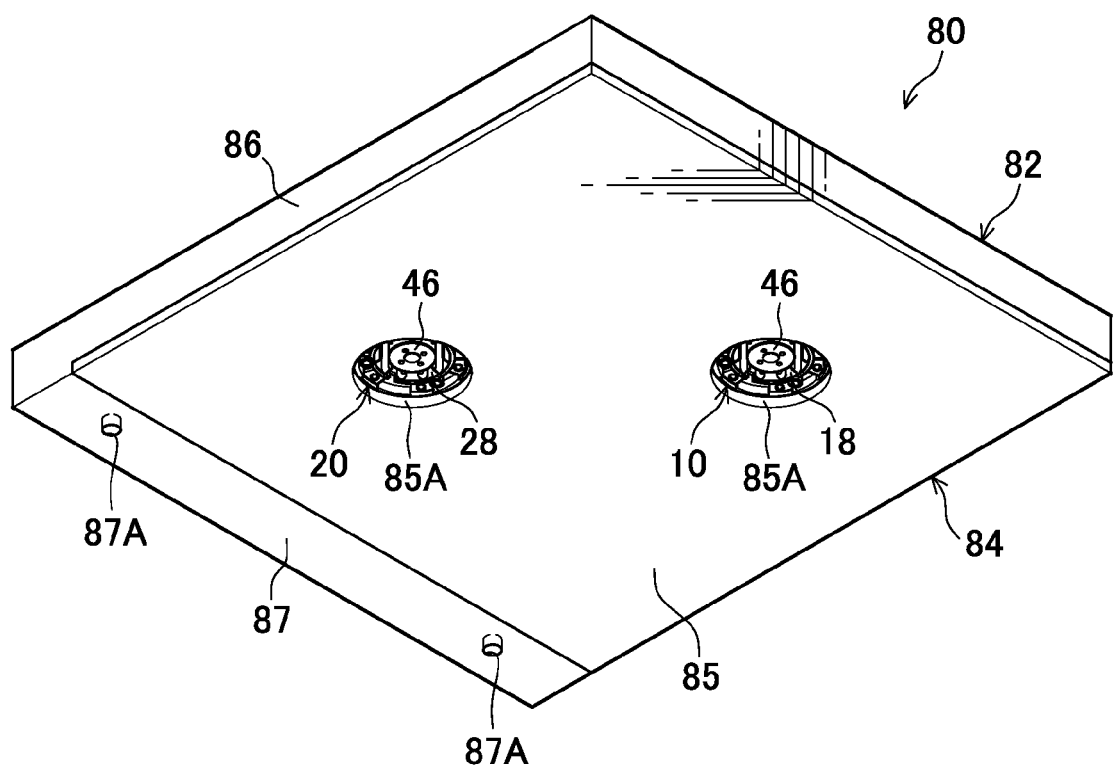
FIG. 3 is a perspective view in a case of viewing the magazine relating to the first embodiment from below.
Figure 4:
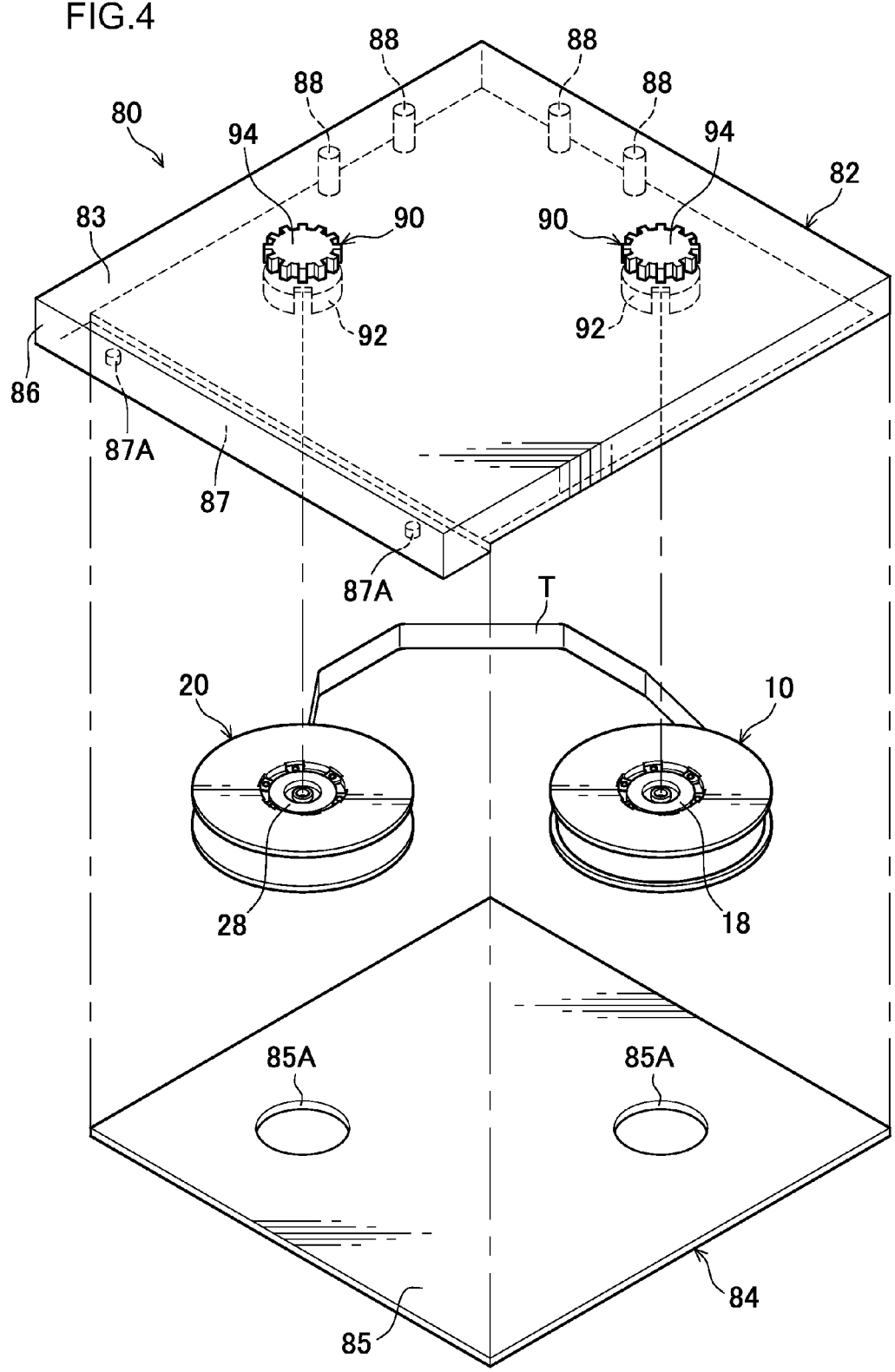
FIG. 4 is an exploded perspective view of the magazine relating to the first embodiment.

A magazine 80, that relates to a first embodiment and is for installing the pair of reels 10, 20 into this drive device 60, is described next. As shown in FIG. 2 through FIG. 4, this magazine 80 has an upper cartridge 82 that has a portion of a bottom wall 85 (hereinafter called "bottom surface portion 87"), and a lower cartridge 84 that structures the bottom wall 85 and that is provided detachably with respect to the upper cartridge 82.

Namely, the upper cartridge 82 is formed in a substantially rectangular box shape at which a side wall 86 is provided to stand integrally at the peripheral edge portion of a ceiling wall 83, and the lower cartridge 84 (the bottom wall 85) is formed in the shape of a flat plate. Further, a pair of opening portions 85A, that are for exposing, to the exterior, respective reinforcing portions 18, 28 of respective reel hubs 12, 22 at the respective reels 10, 20, are formed in predetermined positions of the lower cartridge 84 (the bottom wall 85).

Note that the materials of the upper cartridge 82 and the lower cartridge 84 are not particularly limited. For example, the upper cartridge 82 and the lower cartridge 84 may be molded of a metal material such as a sheet metal or the like, or may be molded of a synthetic resin material such as PC or the like that is the same as the reels 10, 20. Further, it does not matter if an arbitrary structure is employed for the structure of detachably providing the lower cartridge 84 at the upper cartridge 82.

For example, a structure may be employed in which groove portions (not shown) are formed in the bottom end portion of the side wall 86 at the both sides of the bottom surface portion 87, and, by causing mutually-opposing side edge portions of the lower cartridge 84 to enter into these groove portions from the side opposite the bottom surface portion 87 and sliding the side edge portions toward this bottom surface portion 87 side, the lower cartridge 84 can be attached to the upper cartridge 82, or the like.

Further, an opening portion (not shown), that is for, when the recording tape T that is unrecorded is wound on the reel 10 for drawing-out, causing the unrecorded recording tape T, that is supplied from a winding device 50 that is described later, to enter into the magazine 80, and mounting the free end thereof to the outer peripheral surface of the reel hub 12, and winding this recording tape T onto the reel hub 12, is formed in the side wall 86 of this upper cartridge 82. Moreover, a closing member (not shown), that closes this opening portion, is provided so as to be able to be attached to and removed from the side wall 86.

Further, plural (four in the illustrated structure) tape guides (temporary guides) 88 that are solid cylindrical are provided to project downward at predetermined positions of the inner surface of the ceiling wall 83 of the upper cartridge 82, i.e., positions (see FIG. 1) that are apart, further toward the outer sides in directions orthogonal to the rotation axial directions, from the respective reels 10, 20 (the recording/playback head 70), than the tape guides 72 of the drive device 60 in plan view.

Further, a pair of reel holding mechanisms 90 that hold the respective reels 10, 20 are provided at the ceiling wall 83 of the upper cartridge 82. The reel holding mechanisms 90 of the magazine 80 relating to the first embodiment have claw portions 92 that are inserted from above into the inner peripheral surface sides of the reel hubs 12, 22 that are described later, and push and hold these inner peripheral surfaces toward the radial direction outer side, and grasping portions 94 that rotatably support these claw portions 92 and are structured so as to be able to release the pushed states by these claw portions 92.

Further, upper flanges 14, 24 and lower flanges 16, 26 of the reels 10, 20, that are in states of being held by the respective reel holding mechanisms 90, do not contact the inner surfaces of the upper cartridge 82 and the lower cartridge 84 of the magazine 80 (gaps are formed between the upper flanges 14, 24 and the lower flanges 16, 26 of the reels 10, 20 and the inner surfaces of the upper cartridge 82 and the lower cartridge 84 of the magazine 80).

Due thereto, this is a structure in which, at times of conveying the magazine 80 or the like, the upper flange 14 and the lower flange 16 of the reel 10 in particular are prevented from being deformed by the inner surfaces of this upper cartridge 82 and lower cartridge 84. Namely, due thereto, there is a structure in which it is difficult for damage to arise at the transverse direction both end portions (hereinafter called "edges") of the recording tape T that is wound on the reel 10.

Further, plural (two in the illustrated structure) reference holes (engaged portions) 87A, through which positioning pins (engaging portions) 74 (see FIG. 1) of the drive device 60 are inserted, are formed at predetermined positions of the bottom surface portion 87 of the upper cartridge 82. Due thereto, there is a structure in which the placed position of the magazine 80 with respect to the drive device 60 is prescribed (positioned).

The reels 10, 20 are described next on the basis of FIG. 6 through FIG. 8. The reel 10, that is housed in the magazine 80 and is supplied from this magazine 80 to the drive device 60, is structured to include the reel hub 12 that is substantially cylindrical tube shaped and structures an axially central portion, the upper flange 14 that is annular and that is provided at the upper end portion side thereof, the lower flange 16 that is annular and that is provided at the lower end portion side thereof, and the reinforcing portion 18 that is integrally continuous with the height (axial) direction substantially central portion at the inner peripheral surface of the reel hub 12.

Similarly, the reel 20, that is housed in the magazine 80 and is supplied from this magazine 80 to the drive device 60, also is structured to include the reel hub 22 that is substantially cylindrical tube shaped and structures an axially central portion, the upper flange 24 that is annular and that is provided at the upper end portion side thereof, the lower flange 26 that is annular and that is provided at the lower end portion side thereof, and the reinforcing portion 28 that is integrally continuous with the height (axial) direction substantially central portion at the inner peripheral surface of the reel hub 22.

Further, the recording tape T, such as a magnetic tape or the like that serves as an information recording/playback medium, is wound on the outer peripheral surface of the reel hub 12 at the reel 10, and the transverse direction end portions of the wound recording tape T are held by the upper flange 14 and the lower flange 16. Note that the recording tape T that is drawn-out from the reel 10 is wound on the outer peripheral surface of the reel hub 22 at the reel 20, and the transverse direction end portions thereof are held by the upper flange 24 and the lower flange 26.

Further, "substantially cylindrical tube shaped" in the present embodiment includes structures that are approximately solid cylindrical and at which the shapes of the outer peripheral surfaces (winding surfaces) of the respective reel hubs 12, 22 around which the recording tape T is wound are formed in a drum shape or the like, and structures that are hollow and are not completely solid cylindrical and at which ribs or the like are provided to project at the inner peripheral surface sides of the respective reel hubs 12, 22, and the like.

Note that, in the following description, because the reel 20 has the same structure as the reel 10, mainly the reel 10 is described. As shown in FIG. 6 through FIG. 8, a cylindrical tube portion 15, that extends downward by a predetermined height, is formed integrally with the inner peripheral edge portion of the upper flange 14, and a cylindrical tube portion 17, that extends upward by a predetermined height, is formed integrally with the inner peripheral edge portion of the lower flange 16.

Plural (e.g., six of each) overhang portions 32, 34, that are flat plate shaped and project-out toward the radial direction inner side (the rotation central portion of the reel 10) respectively, are formed at the inner peripheral surface of the cylindrical tube portion 15 and the inner peripheral surface of the cylindrical tube portion 17 at uniform intervals at positions that do not overlap one another in plan view. Hole portions 32A, 34A that are respectively circular are formed in the respective overhang portions 32, 34.

Further, plural (e.g., six of each of) screw boss portions 33, 35, that are cylindrical tube shaped and at whose inner peripheral surfaces female screws are cut, are formed to project at the top surface and bottom surface of the outer peripheral edge portion side (the inner peripheral surface side of the reel hub 12) at the reinforcing portion 18 of the reel hub 12, at uniform intervals respectively at positions that do not overlap one another in plan view. Further, the respective screw boss portions 33, 35 and the hole portions 32A, 34A of the respective overhang portions 32, 34 communicate with one another.

Accordingly, the upper flange 14 and the lower flange 16 are respectively mounted integrally to the reel hub 12 due to screws 36, that are inserted into the hole portions 32A of the overhang portions 32 of the upper flange 14 from above, being screwed-together with the screw boss portions 33, and the screws 36, that are inserted into the hole portions 34A of the overhang portions 34 of the lower flange 16 from below, being screwed-together with the screw boss portions 35 (see FIG. 8).

Further, three screw hole portions 40, that are for fixing the reinforcing portion 18 to a rotating member 64 of the drive device 60 that is described later, are formed at uniform intervals on a circumference that is concentric with the reinforcing portion 18, further toward the radial direction inner side than the cylindrical tube portion 15 and the cylindrical tube portion 17 (in plan view, between specific ones of the screw boss portions 33 and the screw boss portions 35). Projecting portions 42, that project downward in the forms of cylindrical tubes that are coaxial with the screw hole portions 40 (communicate with the screw hole portions 40), are formed integrally with the bottom surface sides of these screw hole portions 40 (see FIG. 8).

Figure 6:
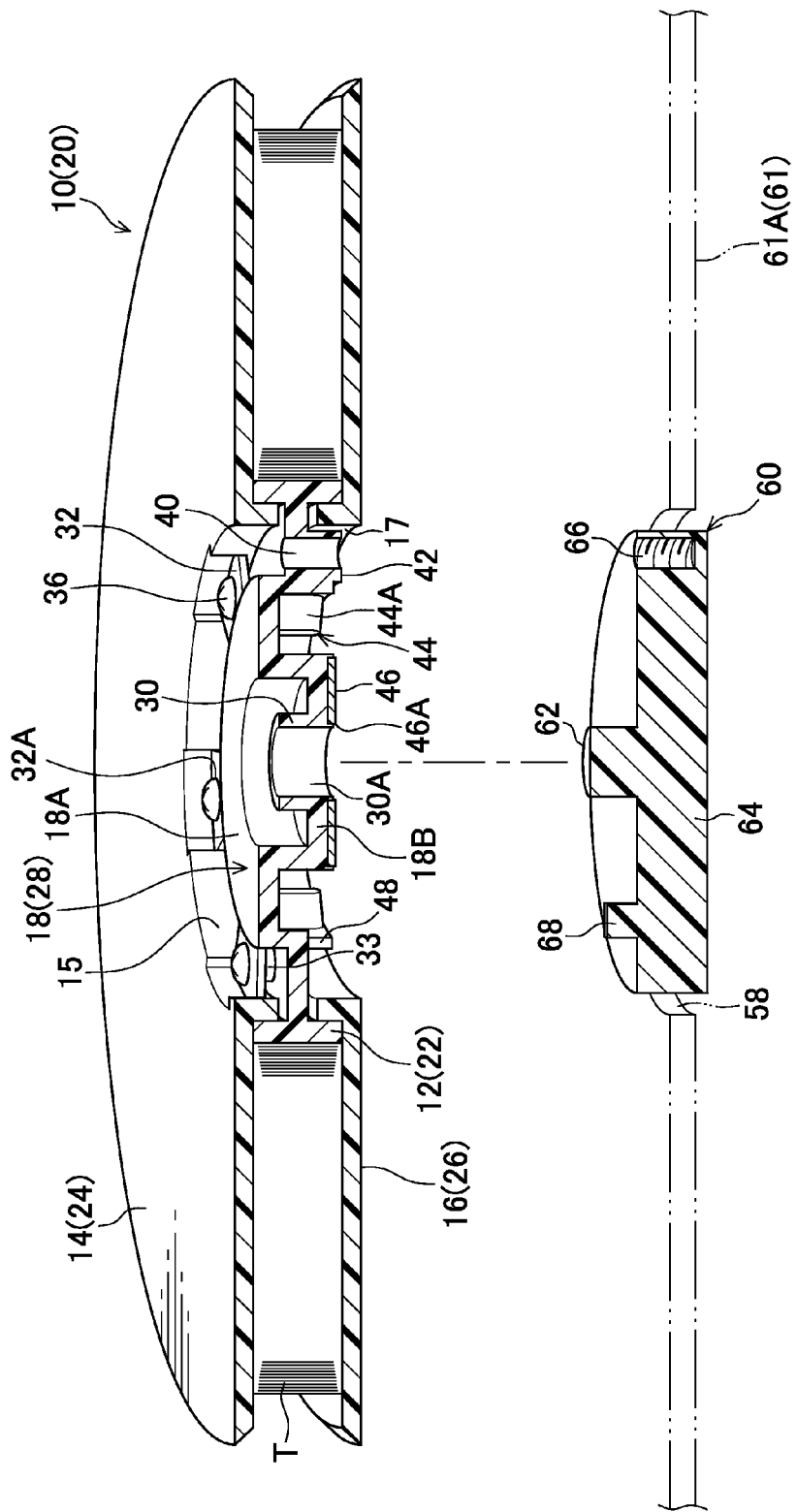
FIG. 6 is a perspective sectional view showing the reel and a rotating member of the drive device.
Figure 7:
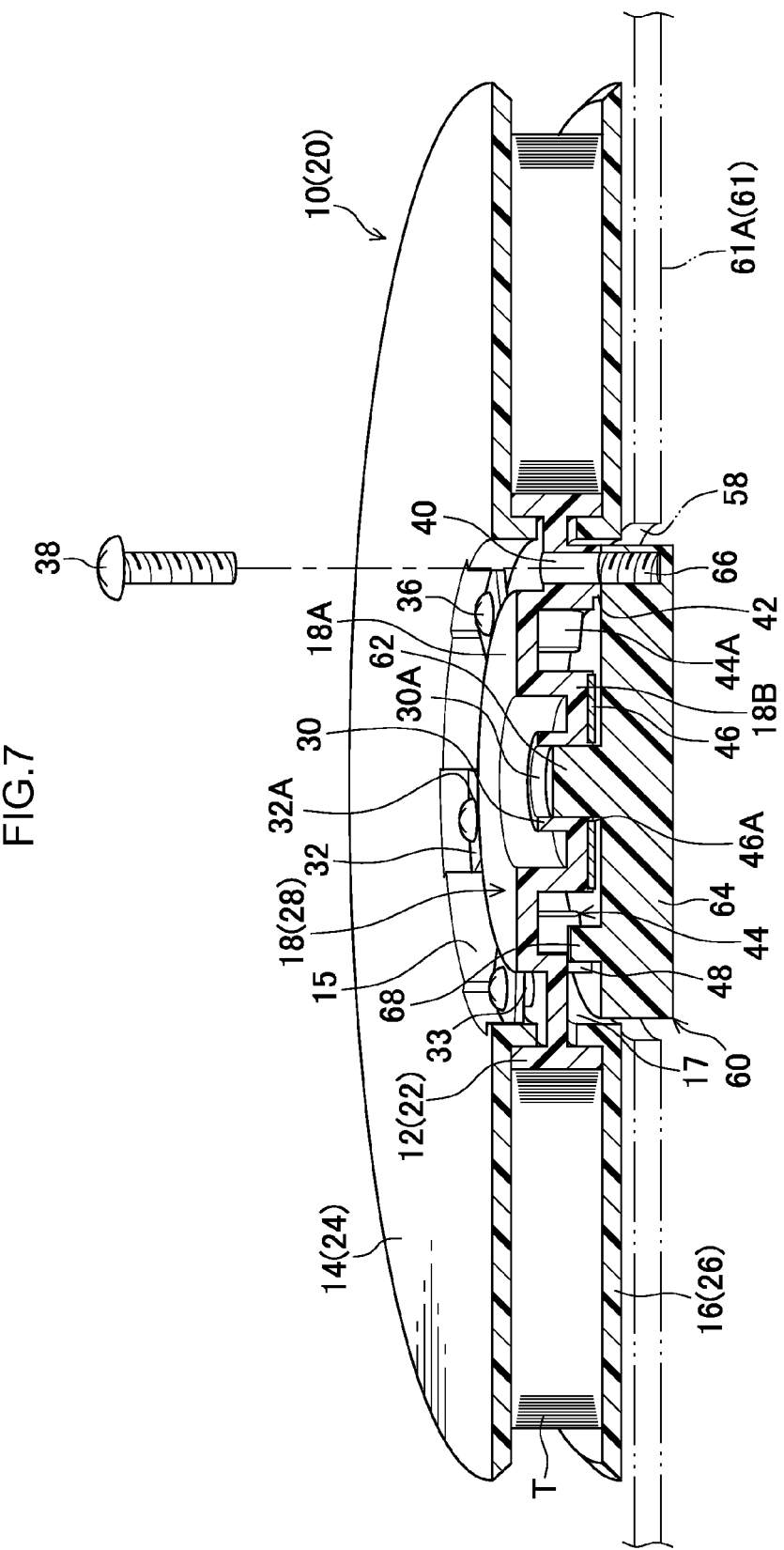
FIG. 7 is a perspective sectional view showing the reel that is fixed to the rotating member of the drive device.
Figure 8:
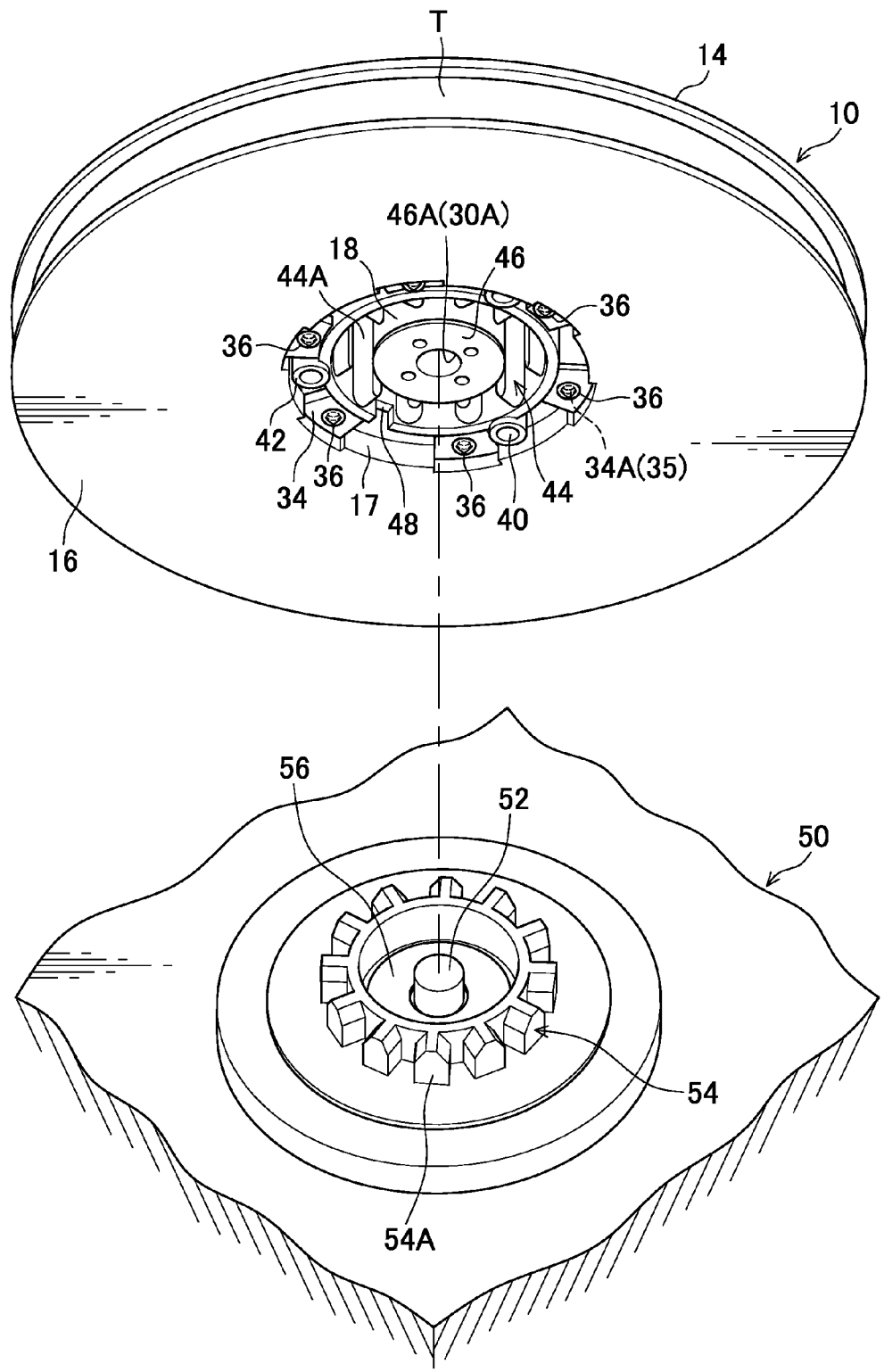
FIG. 8 is a perspective view showing a reinforcing portion of a reel hub and a driving gear of a winding device to which the reel is attached.

Further, as shown in FIG. 6, FIG. 7, an annular top surface portion 18A, that projects upwardly to the extent of not projecting-out from the top surface of the upper flange 14 in side view, is formed at the reinforcing portion 18 further toward the radial direction inner side than the screw boss portions 40 (the screw boss portions 33, 35). Further, an annular bottom surface portion 18B, that projects downwardly to the extent of not projecting-out from the bottom surface of the lower flange 16 in side view, is formed at the reinforcing portion 18 further toward the radial direction inner side than this annular top surface portion 18A.

Still further, a small cylindrical tube portion 30, that projects upward to the extent of not projecting-out upwardly from the annular top surface portion 18A in side view, is formed at the central portion of the reinforcing portion 18 (the rotation central portion of the reel 10) further toward the radial direction inner side than this annular bottom surface portion 18B. A projecting shaft portion 62 of the drive device 60 or a projecting shaft portion 52 of the winding device 50, that are described later, is inserted into (fit-together with) a hole portion 30A of this small cylindrical tube portion 30.

Further, a reel gear 44 is formed in an annular shape at the bottom surface side of the annular top surface portion 18A and at the radial direction outer side portion thereof. This reel gear 44 is structured by plural vertical ribs 44A that extend in the height (axial) direction, and can mesh together with plural vertical ribs 54A of a driving gear 54 of the winding device 50 shown in FIG. 8 so as to be freely attached thereto and removed therefrom.

Further, three concave portions 48 (see FIG. 8), with which convex portions 68 of the rotating member 64 that is described later and shown in FIG. 6, FIG. 7 fit-together, are formed at uniform intervals (so as to be disposed midway between the respective screw boss portions 40) at predetermined positions between these vertical ribs 44A (on a circumference that is concentric with the reinforcing portion 18). Further, as shown in FIG. 8, a reel plate 46, that is formed in an annular form of a magnetic metal, is fixed by insert molding to the annular bottom surface portion 18B that is formed further toward the radial direction inner side than the reel gear 44.

A hole portion 46A, that is formed in the central portion of this reel plate 46, communicates with the hole portion 30A of the small cylindrical tube portion 30, and the inner diameter of this hole portion 46A is either the same as or is a slightly larger diameter than the inner diameter of the hole portion 30A. Further, the projecting shaft portion 62 of the drive device 60 or the projecting shaft portion 52 of the winding device 50, that are described later, can be inserted through this hole portion 46A into the hole portion 30A.

Here, as described above, the driving gear 54 of the winding device 50 can mesh-together with the reel gear 44 of the reel 10. Namely, as shown in FIG. 8, the driving gear 54 of the winding device 50 has the plural vertical ribs 54A that extend in a radial form toward the radial direction outer side, and the projecting shaft portion 52 that is solid cylindrical is provided to project upwardly at the rotation central portion of this driving gear 54. Further, an annular magnet 56 is fixed further toward the radial direction outer side than this projecting shaft portion 52 and further toward the radial direction inner side than the driving gear 54.

Accordingly, at the time of manufacturing the reel 10, when the unrecorded recording tape T is wound onto the outer peripheral surface of the reel hub 12 thereof, the driving gear 54 is made to enter in from the opening portion 85A that is formed in the lower cartridge 84 (the bottom wall 85) of the magazine 80. Thereupon, the projecting shaft portion 52 is inserted through the hole portion 46A into the hole portion 30A, the reel plate 46 is attracted by the magnet 56, and the driving gear 54 meshes-together with the reel gear 44. Then, due to the driving gear 54 of the winding device 50 rotating, the unrecorded recording tape T is wound onto the reel hub 12 of the reel 10.

On the other hand, as shown in FIG. 5 through FIG. 7, a motor (not illustrated) that serves as a drive source is disposed at the drive device 60. A pair of the rotating members 64, that are formed of resin or metal and to which rotational driving force is transmitted via transmission gears (not illustrated) from a rotating shaft (not illustrated) of this motor, are rotatably provided respectively in a pair of opening portions 58 that are formed in the housing 61 (the bottom plate 61A) of the drive device 60.

The reinforcing portions 18, 28 of the reel hubs 12, 22 at the respective reels 10, 20 are fixed by screws 38 shown in FIG. 7 to the respective rotating members 64. Namely, three screw boss portions 66, with which the screws 38 that are inserted into the screw hole portions 40 of the respective reinforcing portions 18, 28 are screwed-together, are formed at uniform intervals on circumferences that are concentric with the respective rotating members 64.

Further, the three convex portions (positioning portions) 68, that fit-together with the concave portions (positioning portions) 48 that are formed at the reinforcing portions 18, 28 of the respective reel hubs 12, 22, are provided to project at uniform intervals, so as to be disposed midway between the respective screw boss portions 66 of the respective rotating members 64. Still further, the projecting shaft portions 62, that are solid cylindrical and are inserted through the hole portions 46A of the reel plates 46 into the hole portions 30A of the reinforcing portions 18, 28 (the small cylindrical tube portions 30), are provided to project upwardly at the central portions (the rotation central portions) of the respective rotating members 64.

Accordingly, when the reel 10, on which the recording tape T is wound, and the reel 20, at which the free end of the recording tape T is mounted to the outer peripheral surface of the reel hub 22, are fixed to the respective rotating members 64 of the drive device 60, the respective projecting shaft portions 62 are inserted through the respective hole portions 46A into the respective hole portions 30A. Then, due to the respective convex portions 68 being fit-together with the respective concave portions 48, the positions of the respective screw hole portions 40 and the respective screw boss portions 66 are made to coincide. Due to the screws 38 being inserted into the respective screw hole portions 40 from above and being screwed-together with the respective screw boss portions 66, the respective reel hubs 12, 22 and the respective rotating members 64 are fixed integrally.

Operation (the method of installing the reels 10, 20 into the drive device 60) of the structure described above is described next. First, at the time of manufacturing the reel 10, when the unrecorded recording tape T is wound onto the outer peripheral surface of the reel hub 12 thereof, the reel 10 on which the recording tape T is not wound is attached to the winding device 50.

Namely, at the reel 10 that is housed within the magazine 80 and that is held by the reel holding mechanism 90, the reel gear 44, that is exposed from the opening portion 85A of the lower cartridge 84, is made to mesh-together with the driving gear 54 of the winding device 50.

At this time, the projecting shaft portion 52 of the winding device 50 is passed-through the hole portion 46A of the reel plate 46, and is inserted into the hole portion 30A of the reinforcing portion 18 (the small cylindrical tube portion 30). Then, the magnet 56 of the winding device 50 attracts the reel plate 46. Accordingly, the reel gear 44 of the reel 10 meshes-together with the driving gear 54 of the winding device 50 with good positional accuracy.

When the reel gear 44 and the driving gear 54 mesh-together with good positional accuracy, the grasping portion 94 is operated, the holding of the reel holding mechanism 90 with respect to the reel 10 is released, the closing member (not shown) is detached from the side wall 86 of the upper cartridge 82, the free end of the unrecorded recording tape T is made to enter in from the opening portion (not shown) formed in this side wall 86, and this free end is mounted to the outer peripheral surface of the reel hub 12.

Then, by rotating the driving gear 54 in one direction at high speed, the unrecorded recording tape T is wound onto the reel hub 12 of the reel 10. When the winding step, that winds the unrecorded recording tape T onto the reel hub 12 of reel 10, is finished, the free end at the final end side of this recording tape T is mounted to the outer peripheral surface of the reel hub 22 of the reel 20, while the final end portion of this recording tape T is made to run along the tape guides 88.

Then, the respective grasping portions 94 are operated, the inner peripheral surfaces of the respective reel hubs 12, 22 are pushed toward the radial direction outer sides by the respective claw portions 92 of the respective reel holding mechanisms 90, and the respective reels 10, 20 are held by the respective reel holding mechanisms 90 at the upper cartridge 82 such that falling-off is prevented and rotation is impossible (holding step). Then, the reel gear 44 of the reel 10 is detached from the driving gear 54 of the winding device 50, and the magazine 80 is detached from the winding device 50.

Note that, at this time, the respective upper flanges 14, 24 and the respective lower flanges 16, 26 of the respective reels 10, 20 do not contact the inner surfaces of the upper cartridge 82 and the lower cartridge 84 (the inner surface of the side wall 86 in particular). Accordingly, during conveying of the magazine 80 or the like, even if a shock is applied to this magazine 80 (due to dropping or the like), this shock being transmitted to, in particular, the upper flange 14 and the lower flange 16 of the reel 10 that is housed within the magazine 80 is suppressed or prevented. Accordingly, it is difficult for edge damage to arise at the recording tape T that is wound on the reel 10.

Figure 5A:
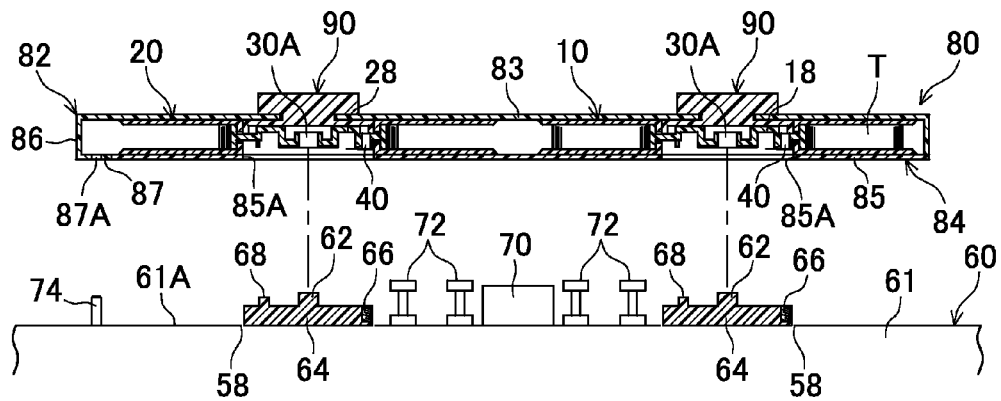
FIG. 5A is an explanatory drawing showing a step of installing the reels into the drive device by using the magazine relating to the first embodiment.
Figure 5B:
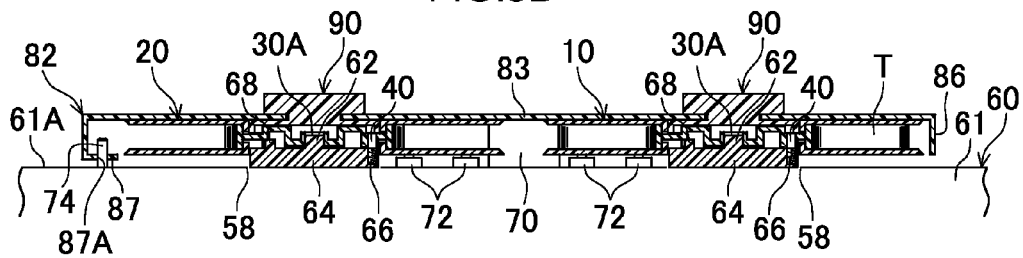
FIG. 5B is an explanatory drawing showing a step of installing the reels into the drive device by using the magazine relating to the first embodiment.

When the unrecorded recording tape T is wound on the reel 10 in this way, as shown in FIG. 5A, this magazine 80 is conveyed to the drive device 60. Then, as shown in FIG. 5B, the lower cartridge 84 (the bottom wall 85) is detached (detaching step), and the positioning pins 74 of the drive device 60 are inserted through the reference holes 87A that are formed in the bottom surface portion 87 of the upper cartridge 82. Due thereto, the respective reels 10, 20 are positioned with respect to the respective rotating members 64 of the drive device 60.

Namely, the reinforcing portions 18, 28 of the reel hubs 12, 22 at the respective reels 10, 20 are positioned and placed on the respective rotating members 64 of the drive device 60 (placement step). Note that, at this time, the tape guides 88, that are provided to project at the inner surface of the ceiling wall 83 of the upper cartridge 82, are disposed further toward the outer sides, in directions orthogonal to the rotation axial directions of the respective reels 10, 20, than the tape guides 72 of the drive device 60, and do not interfere with the tape guides 72 (see FIG. 1). Therefore, positioning and placing of the upper cartridge 82, that is holding the respective reels 10, 20, onto the bottom plate 61A of the housing 61 of the drive device 60 can be accomplished easily.

Now, when the reinforcing portions 18, 28 of the respective reel hubs 12, 22 are placed on the respective rotating members 64, the projecting shaft portions 62 of the respective rotating members 64 are inserted through the hole portions 46A of the reel plates 46 at the respective reels 10, 20, and are inserted into the hole portions 30A of the respective reinforcing portions 18, 28 (small cylindrical tube portions 30). Due thereto, the radial direction positions of the respective reel hubs 12, 22 (the reinforcing portions 18, 28) with respect to the respective rotating members 64 are positioned (centered) with good accuracy.

Further, the convex portions 68 of the respective rotating members 64 are fit-together with the concave portions 48 that are formed in the reinforcing portions 18, 28 of the respective reel hubs 12, 22. Accordingly, the peripheral direction positions (rotation angles) of the respective reel hubs 12, 22 (reinforcing portions 18, 28) with respect to the respective rotating members 64 are positioned with good accuracy, and the positions of the screw hole portions 40 at the reinforcing portions 18, 28 of the respective reel hubs 12, 22, and the screw boss portions 66 at the respective rotating members 64, are made to coincide. Note that, at this time, the reels 10, 20 may be rotated slightly by the grasping portions 94 and guided so as to fit the convex portions 68 together with the concave portions 48.

Figure 5C:
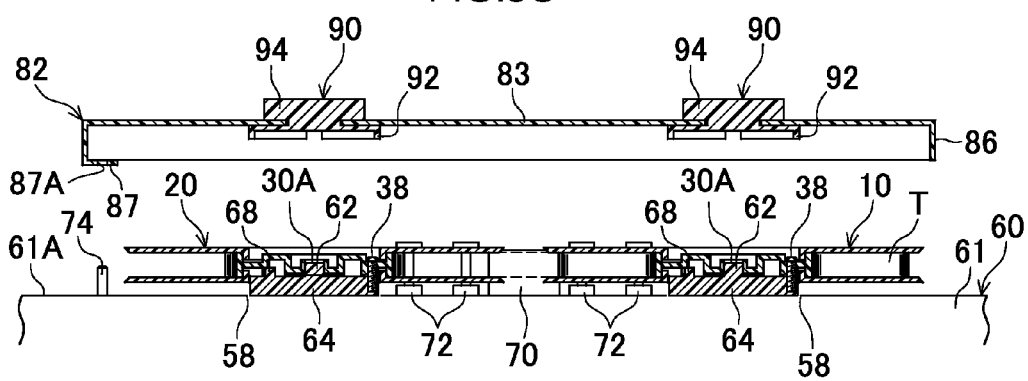
FIG. 5C is an explanatory drawing showing the step of installing the reels into the drive device by using the magazine relating to the first embodiment.

When the positions of the reel hubs 12, 22 with respect to the rotating members 64 are prescribed in this way, the grasping portions 94 are operated, the pushing (holding) of the claw portions 92 with respect to the inner peripheral surfaces of the respective reel hubs 12, 22 is released (releasing step), and, as shown in FIG. 5C, the upper cartridge 82 is removed from the housing 61 interior (from on the bottom plate 61A) of the drive device 60 (removing step). Then, the reinforcing portion 18 of the reel hub 12 is fixed to the one (the first) rotating member 64, and the reinforcing portion 28 of the reel hub 22 is fixed to the other (the second) rotating member 64 (fixing step).

Namely, as shown in FIG. 7, the screws 38 are inserted into the screw hole portions 40, and are screwed-together with the screw boss portions 66. At this time, the projecting portions 42, that are formed (provided to project) at the bottom surfaces of the screw hole portions 40, abut the top surfaces of the rotating members 64, and therefore, the positions in the height (axial) direction of the respective reels 10, 20 (the reinforcing portions 18, 28 of the respective reel hubs 12, 22) are positioned and fixed with good accuracy with respect to the respective rotating members 64.

Further, when the upper cartridge 82 is removed from the housing 61 interior (from on the bottom plate 61A) of the drive device 60, as shown in FIG. 1, the tape guides 88 are disposed further toward the outer side than the tape guides 72 (the side in a direction of moving away from the respective reels 10, 20 in a direction orthogonal to the rotation axial directions thereof, positions that are apart from the recording/playback head 70 at a same direction side), and therefore, the recording tape T is in a slightly slack state.

Accordingly, when the upper cartridge 82 is removed, the rotating members 64 are rotated slightly, and the recording tape T is wound slightly on the reel hub 12 or the reel hub 22 and is made to run along the tape guides 72. Due thereto, the recording tape T, that was being guided by the tape guides 88 of the upper cartridge 82, can be transferred smoothly to the tape guides 72 of the drive device 60 (the recording tape T can be passed easily at the time of installing the respective reels 10, 20 into the drive device 60).

In this way, in accordance with the method of installing the reels 10, 20 using the magazine 80 relating to the first embodiment, the respective reels 10, 20 are installed into the housing 61 of the drive device 60 in a state of being held by the upper cartridge 82 of the magazine 80, and therefore, the ability to install the pair of reels 10, 20 is excellent. Moreover, because this upper cartridge 82 and lower cartridge 84 and the like can be reused, it is preferable for the environment as well.

Note that the possibility that an unrecorded recording tape T will be wound onto the reel 20 for take-up is small. Therefore, depending on the way of manufacturing, it is possible to not provide the reel gear 44 and the reel plate 46 at the reel 20 for take-up.

A magazine 100 relating to a second embodiment is described next. Note that regions that are equivalent to regions described in the above-described first embodiment are denoted by the same reference numerals, and detailed description thereof (including the operation as well) is omitted.

Further, because the "first vertical position prescribing member" and the "second vertical position prescribing member" relating to the present invention are the same structures, description that differentiates between the "first" and the "second" is omitted in the following explanation. Similarly, because the "first rotational position prescribing member" and the "second rotational position prescribing member" relating to the present invention also are the same structures, description that differentiates between the "first" and the "second" is omitted in the following explanation.

Figure 9:
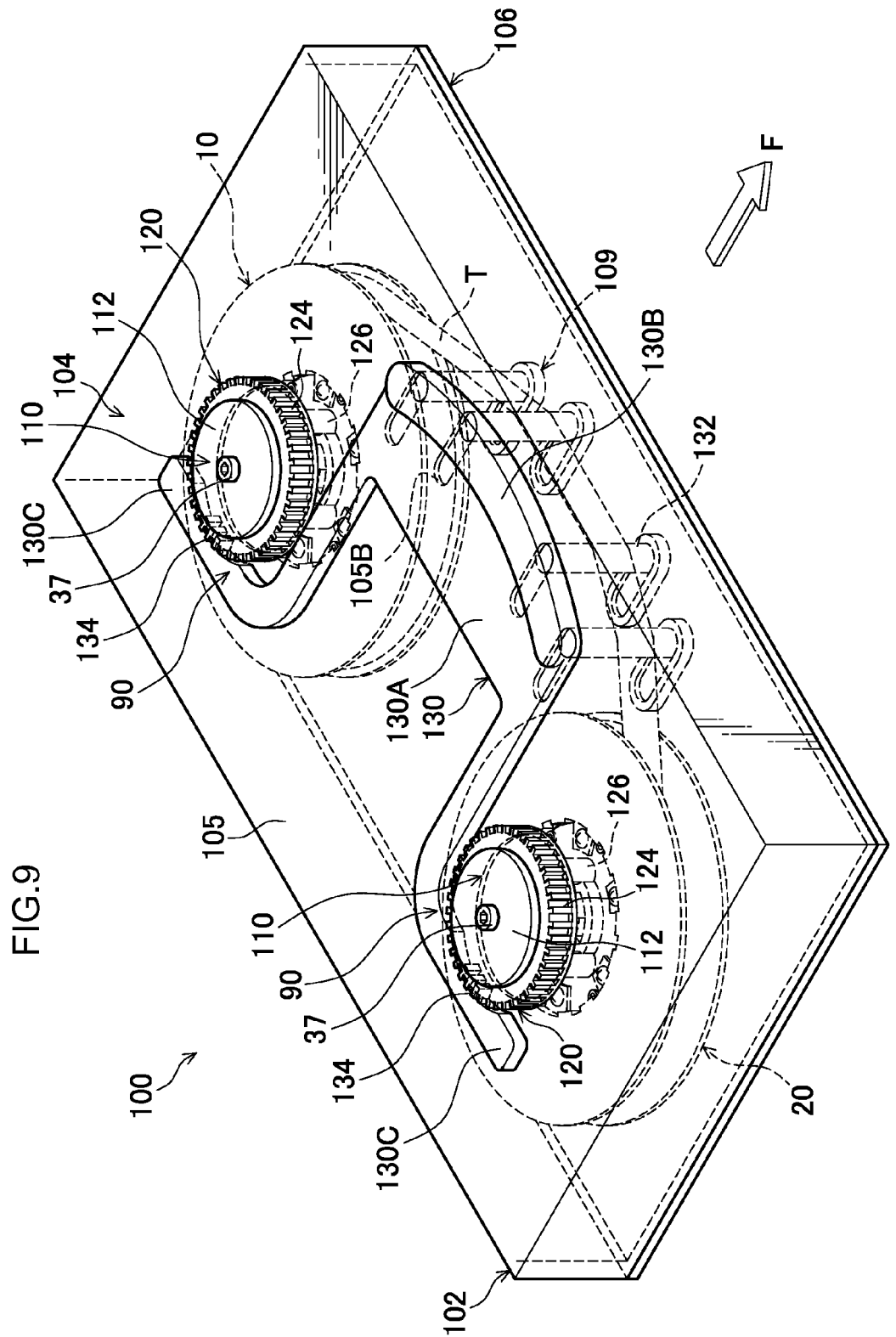
FIG. 9 is a perspective view in a case of viewing a magazine relating to a second embodiment from above.
Figure 10:
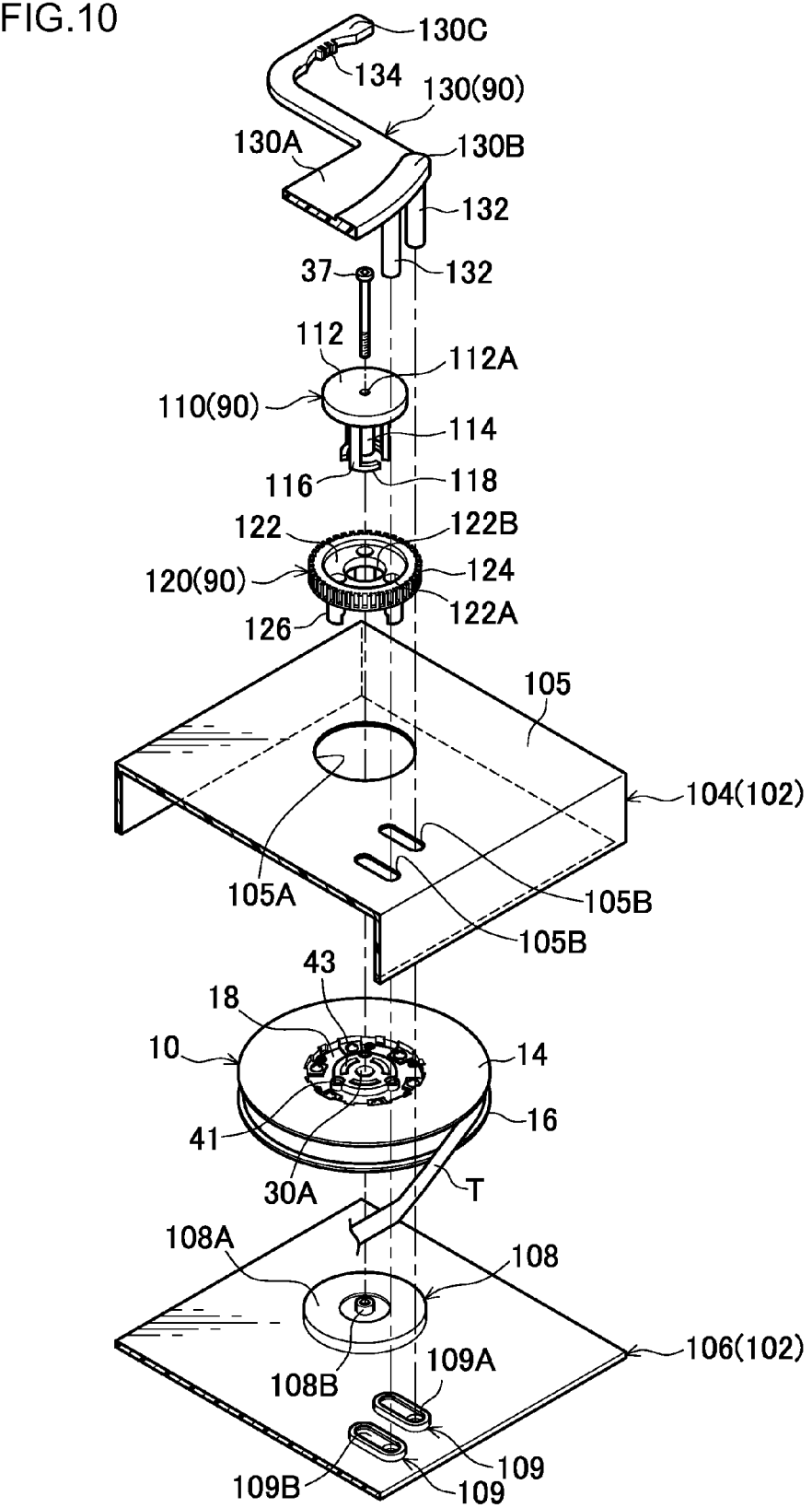
FIG. 10 is a perspective view showing, in an exploded manner, a portion of the magazine relating to the second embodiment.

As shown in FIG. 9, FIG. 10, this magazine 100 has a cartridge 102 that is formed from an upper cartridge 104, that is substantially rectangular box shaped and whose lower side is open, and a lower cartridge 106, that is flat plate shaped and can close the opened lower side of the upper cartridge 104. The upper cartridge 104 is formed of resin or formed of metal, and the lower cartridge 106 is formed of resin. Further, the pair of reels 10, 20 are housed within the cartridge 102 of this magazine 100, and the respective reels 10, 20 are disposed so as to be lined-up in the longitudinal direction of the cartridge 102.

Further, provided at this magazine 100 are vertical position prescribing members 110 that are made of resin and prescribe the positions in the vertical direction (height direction) of the reels 10, 20 that are housed within the cartridge 102, and rotational position prescribing members 120 that are formed of resin and prescribe the positions in the peripheral directions (rotating directions), and a locking member 130 that is formed of resin and that, at times of conveying and the like (until installed into the drive device 60), locks the rotation of the rotational position prescribing members 120 (the reels 10, 20). Further, the reel holding mechanisms 90 of the magazine 100 relating to the second embodiment are structured by these vertical position prescribing members 110, rotational position prescribing members 120, and locking member 130.

As shown in FIG. 10, a pair of opening portions 105A, that are circular and are for the insertion-through of the rotational position prescribing member 120 and the vertical position prescribing member 110 and the like per reel 10, 20, are formed in a ceiling wall 105 of the upper cartridge 104. Further, a same number (four in the illustrated structure) of long hole portions 105B, that are for the insertion-through of plural (four in the illustrated structure) tape guides 132 that are described later of the locking member 130, are formed in the ceiling wall 105 of the upper cartridge 104 with the longitudinal directions thereof being a direction that is orthogonal to the direction in which the reels 10, 20 are lined-up (the longitudinal direction of the cartridge 102), and so as to be lined-up in the longitudinal direction of the cartridge 102.

Note that, as shown in FIG. 17, a bottom surface portion 107 that has reference holes (engaged portions) 107A through which the positioning pins 74 of the drive device 60 are inserted, is formed at the upper cartridge 104 of the magazine 100 relating to the second embodiment. The bottom wall of the cartridge 102 is structured by this bottom surface portion 107 and the lower cartridge 106.

Further, as shown in FIG. 10, base portions 108 that have supporting stands 108A, that are annular and support from beneath the reinforcing portions (reinforcing portions that are substantially circular plate shaped and close the inner peripheral surface sides of the respective reel hubs 12, 22) 18, 28 of the respective reels 10, 20, and screw boss portions 108B, that are cylindrical tube shaped and with which fixing screws 37 that are described later are screwed-together at the rotation central positions of the respective reel hubs 10, 20 within these supporting stands 108A, are formed integrally with the lower cartridge 106 of the magazine 100 relating to the second embodiment.

Further, as shown in detail in FIG. 15, guide lock portions 109 that have lock holes (guide holding portions) 109A, that are circular and have diameters that are slightly smaller than the outer diameters of the tape guides 132 and lock the locking member 130 immovably due to lower end portions 132A thereof being press-fit (held) therein, and guide grooves 109B, that are substantially oval and are formed to the same diameters as and continuously with the lock holes 109A and guide the lower end portions 132A of the tape guides 132 at the time when the tape guides 132 move along the long hole portions 105B, are formed integrally with this lower cartridge 106.

Figure 11:
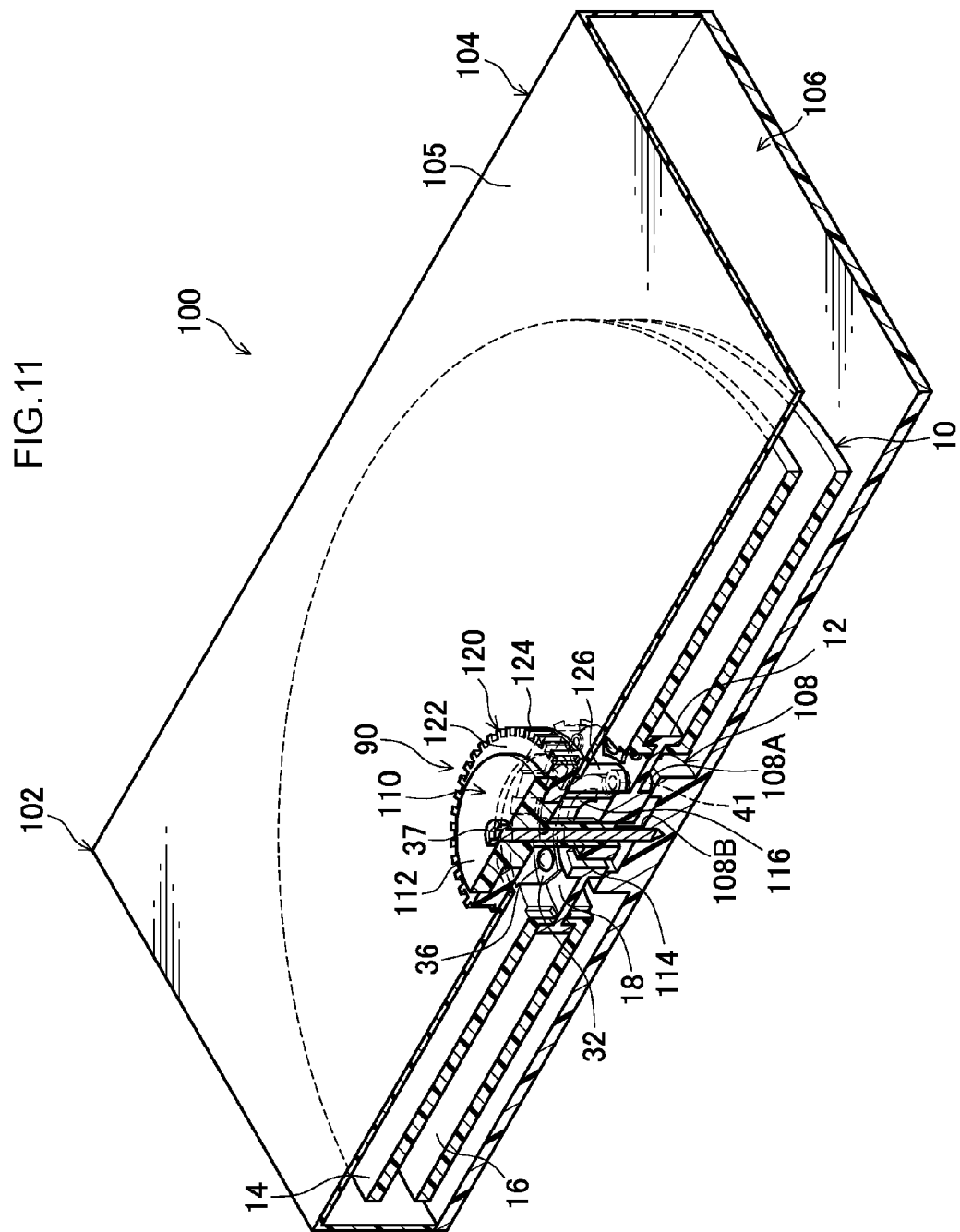
FIG. 11 is a perspective sectional view showing a vertical position prescribing member and a rotational position prescribing member of the magazine relating to the second embodiment.
Figure 12:
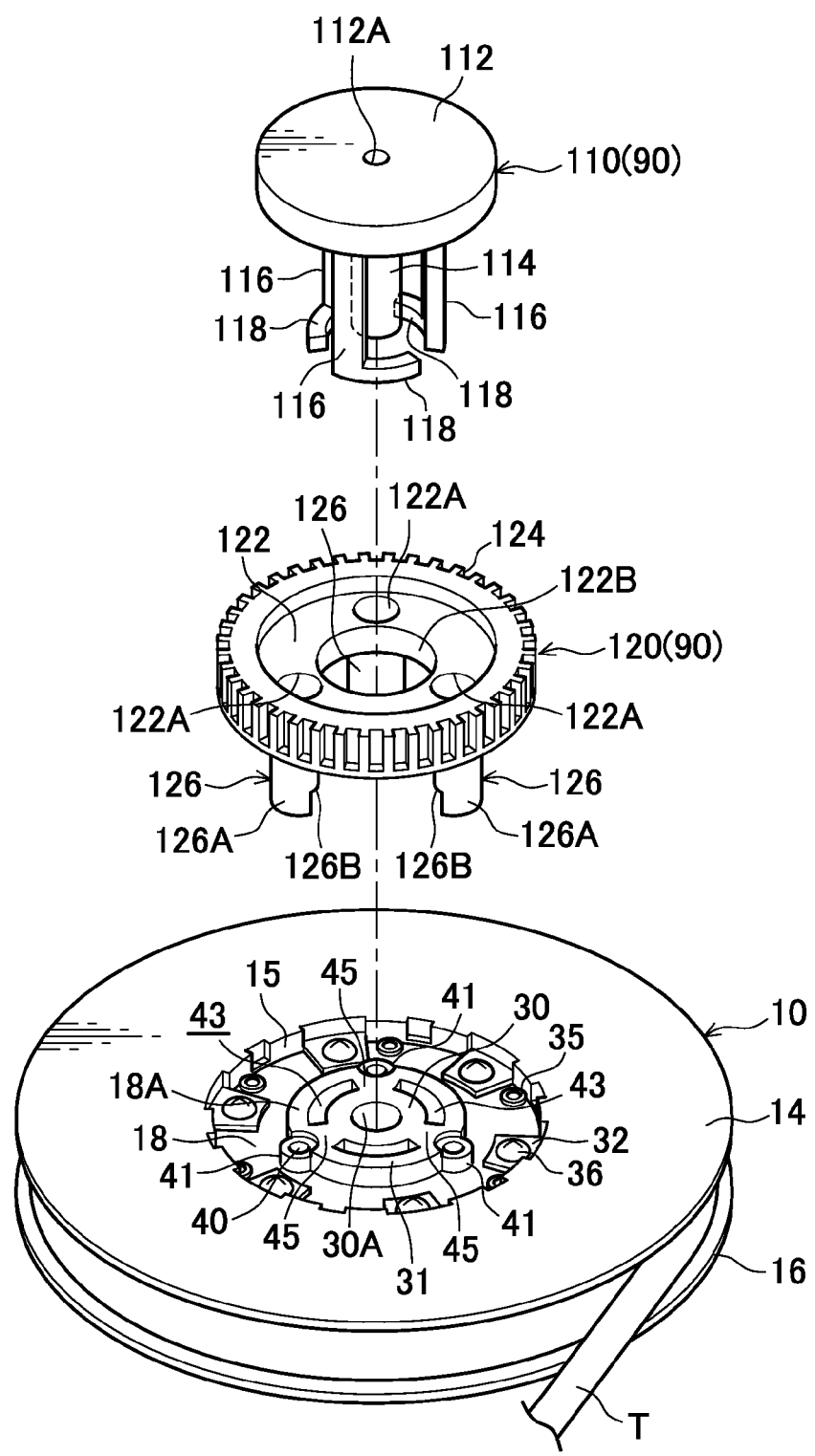
FIG. 12 is an exploded perspective view showing, in an enlarged manner, the vertical position prescribing member and the rotational position prescribing member of the magazine relating to the second embodiment.

Further, as shown in FIG. 11, FIG. 12, the rotational position prescribing member 120 has a main body portion 122 that is circular plate shaped and whose outer diameter is a larger diameter than the opening portion 105A and at which an engaging gear 124 is formed over the entire periphery of the outer peripheral portion, and boss portions 126 that are cylindrical tube shaped and are provided to project at the bottom surface of the main body portion 122 so as to be coaxial with plural (e.g., three) screw hole portions 122A that are formed at uniform intervals on a circumference that is concentric with the main body portion 122.

Extended portions 126A, that are semicircular arc shaped in bottom view and that fit-together with the outer peripheral surfaces of boss portions 41 that are described later of the reinforcing portions 18, 28, are formed at the radial direction outer sides of the lower end portions of the respective boss portions 126. Namely, lower end surfaces 126B of the boss portions 126, that are further toward the radial direction inner sides than the extended portions 126A, abut the top surfaces of the boss portions 41, and the extended portions 126A cover outer peripheral surfaces 41A of the boss portions 41. Further, a through-hole 122B, for the insertion-through of a boss portion 114 and anchor portions 116 that are described later of the vertical position prescribing member 110, is formed in the central portion of the main body portion 122.

Further, as shown in FIG. 12, the vertical position prescribing member 110 has a main body portion 112 that is circular plate shaped and whose outer diameter is a smaller diameter than the main body portion 122 of the rotational position prescribing member 120 (is substantially the same diameter as the opening portion 105A), the boss portion 114 that is cylindrical tube shaped and is provided to project at the center of the bottom surface of the main body portion 112 so as to be coaxial with a screw hole portion 112A that is formed at the central position of the main body portion 112, and the plural (e.g., three) anchor portions 116 that are provided so as to project at uniform intervals at the bottom surface of the main body portion 112 on a circumference that is concentric with the main body portion 112.

Hook portions 118, that extend in the peripheral direction and in one direction, are formed integrally with the lower end portions of the respective anchor portions 116. Further, the anchor portions 116, that have these hook portions 118, and the boss portion 114 are inserted-through the through-hole 122B of the rotational position prescribing member 120, and are inserted-through plural (in this case, three at uniform intervals) circular arc shaped long hole portions 43 and the hole portion 30A, respectively, that are respectively formed in the reinforcing portion 18, 28.

Figure 13A:
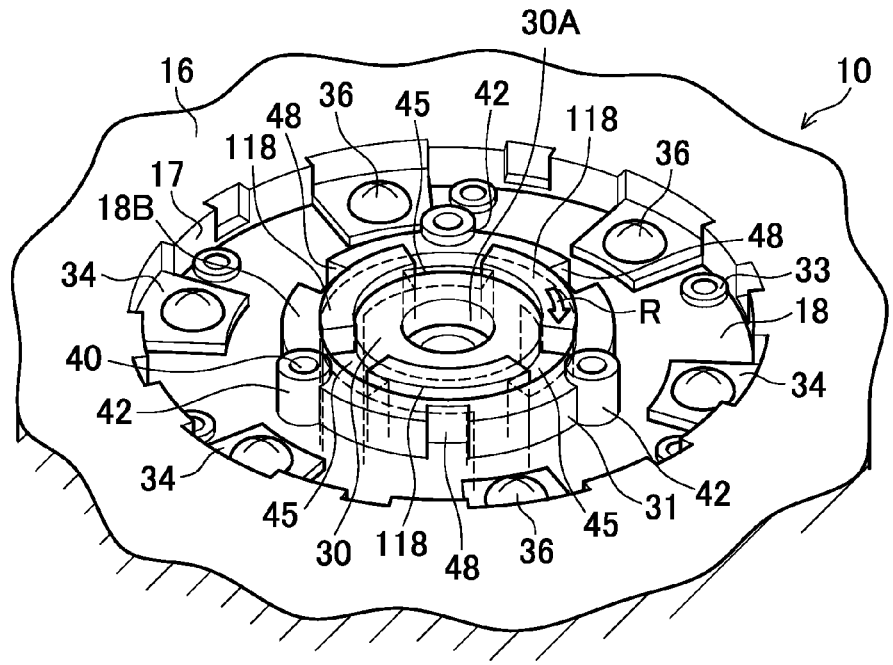
FIG. 13A is a perspective view showing a mounting structure of the vertical position prescribing member shown in FIG. 12.
Figure 13B:
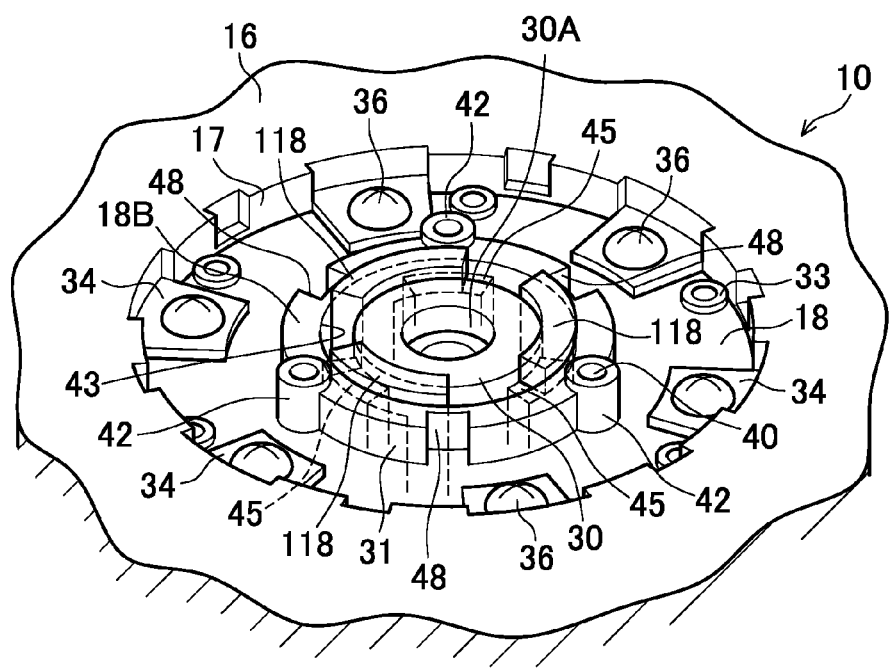
FIG. 13B is a perspective view showing the mounting structure of the vertical position prescribing member shown in FIG. 12.

Here, as shown in FIG. 13, the hook portions 118 of the respective anchor portions 116 that are inserted-through the respective long hole portions 43 are easily anchored on the bottom surfaces of connecting portions 45 due to the anchor portions 116 being rotated in the one direction in which the hook portions 118 extend (the arrow R direction shown in FIG. 13), up until the anchor portions 116 abut side surfaces, that face in the peripheral direction, of the connecting portions 45 that are described later.

Due thereto, as shown in FIG. 11, there is a structure in which the respective vertical position prescribing members 110 are mounted to (are in held states at) the respective reels 10, 20 in states of nipping the respective rotational position prescribing members 120 between the vertical position prescribing members 110 and the reinforcing portions 18, 28 of the respective reels 10, 20, and the respective reels 10, 20 are held in states of being suspended from the ceiling wall 105 of the upper cartridge 104 by the rotational position prescribing members 120 that have the main body portions 122 that have larger diameters than the opening portions 105A.

Further, in this state, due to the fixing screws 37 that serve as fasteners being inserted-through the screw hole portions 112A that are formed at the central positions at the main body portions 112 of the vertical position prescribing members 110, and being screwed-together with the screw boss portions 108B at the base portions 108 of the lower cartridge 106, the upper cartridge 104 and the lower cartridge 106 are joined, and the respective reels 10, 20 are fixed within the cartridge 102 in states in which positions thereof in the vertical direction are prescribed.

Namely, due thereto, there is a structure in which the respective reels 10, 20 are not only positioned and held at the upper cartridge 104 by the vertical position prescribing members 110 and the rotational position prescribing members 120, but also are supported from beneath by the base portions 108 (the supporting stands 108A) of the lower cartridge 106, and, at the interior of the magazine 100 (the cartridge 102), the respective upper flanges 14, 24 do not contact the inner surface of the ceiling wall 105 of the upper cartridge 104, and the respective lower flanges 16, 26 do not contact the inner surface of the lower cartridge 106.

Here, the shapes of the reinforcing portions 18, 28 of the reels 10, 20 in the second embodiment are described. Note that the reinforcing portion 18 of the reel 10 and the reinforcing portion 28 of the reel 20 are the same shape, and therefore, in the second embodiment as well, description is given by using the reinforcing portion 18 of the reel 10 as an example. As shown in FIG. 12, FIG. 13, the shape of the central portion of the reinforcing portion 18 of the reel 10 shown in this second embodiment differs from that of the reinforcing portion 18 of the reel 10 shown in the first embodiment.

Namely, the small cylindrical tube portion 30, and a large cylindrical tube portion 31 whose diameter is larger than the small cylindrical tube portion 30, are provided at the central portion of the reinforcing portion 18, and the outer peripheral surface of the small cylindrical tube portion 30 and the inner peripheral surface of the large cylindrical tube portion 31 are structured so as to be connected integrally by the thee connecting portions 45 that are provided at uniform intervals. Further, the top surface of the large cylindrical tube portion 31 is the annular top surface portion 18A, and the bottom surface is the annular bottom surface portion 18B.

Further, the small cylindrical tube portion 30 and the large cylindrical tube portion 31 are formed to the same heights at the top surface and the bottom surface of the reinforcing portion 18, and the connecting portions 45 are formed to the same heights as the small cylindrical tube portion 30 and the large cylindrical tube portion 31 at the top surface side of the reinforcing portion 18. Namely, these connecting portions 45 are formed to a height that is lower than the small cylindrical tube portion 30 and the large cylindrical tube portion 31 at the bottom surface side of the reinforcing portion 18, and the hook portions 118 that are anchored on the bottom surfaces thereof are structured so as to be substantially flush with the annular bottom surface portion 18B (such that the hook portions 118 do not push the supporting stand 108 relatively when the lower cartridge 106 is joined to the upper cartridge 104).

Further, the projecting portions (boss portions) 42, that are cylindrical tube shaped and project-out further downward than the annular bottom surface portion 18B in side view, are formed integrally at the bottom surface side of the reinforcing portion 18 and at the radial direction outer sides of the respective connecting portions 45. The boss portions 41, that are cylindrical tube shaped and are lower heights than the annular top surface portion 18A in side view, are formed integrally at the top surface side of the reinforcing portion 18 and at the radial direction outer sides of the respective connecting portions 45. Note that the inner portions of these boss portions 41 (projecting portions 42) are made to be the screw hole portions 40.

At the top surface side of the reinforcing portion 18, the heights of the respective boss portions 41 are substantially the same as the heights of the respective extended portions 126A (the projecting heights from the bottom end surfaces 126B). Due to the respective extended portions 126A fitting-together with the outer peripheral surfaces of the boss portions 41 that project-out further toward the radial direction outer side than the annular top surface portion 18A, rotation of the rotational position prescribing member 120 with respect to the reinforcing portion 18 of the reel 10 is stopped, and the rotational position prescribing member 120 can rotate integrally with this reel 10.

Namely, due to rotation of this rotational position prescribing member 120 being restricted by the locking member 130, inadvertent rotation of the reel 10 is impeded. Note that the boss portions 126 of these rotational position prescribing members 120 are also guide portions that guide the screws 38 for reel fixing to the boss portions 41 (the screw hole portions 40) when the reels 10, 20 are mounted to the rotating members 64 of the drive device 60.

Figure 14:
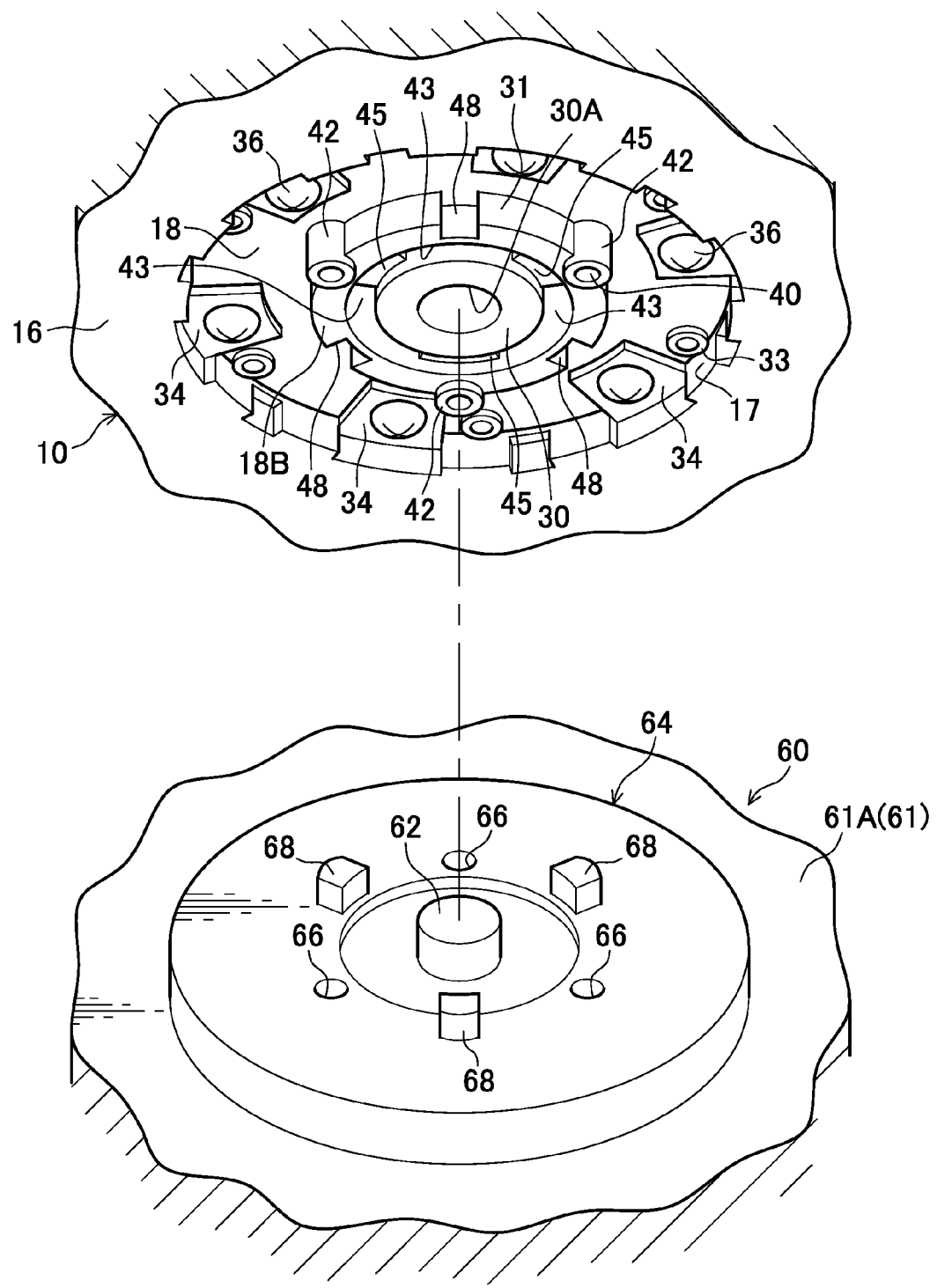
FIG. 14 is a perspective view showing a bottom surface of the reinforcing portion of the reel that is fixed to the rotating member of the drive device.

Further, as shown in FIG. 14, the concave portions (positioning portions) 48, that the convex portions (positioning portions) 68 that are provided to project at the rotating member 64 of the drive device 60 fit together with, are formed at the bottom surface of the reinforcing portion 18 of the reel 10 and midway between the respective projecting portions 42. Note that the concave portions 48 of the reel 10 in the first embodiment are formed so as to open downward, but the concave portions 48 of the reel 10 in the second embodiment are formed so as to open toward the radial direction outer side.

Further, the reel 10, on which the recording tape T is wound in advance, and the reel 20, at which the free end side of this recording tape T is mounted to the outer peripheral surface of the reel hub 22, are housed within the magazine 100 (cartridge 102) relating to the second embodiment. Therefore, there is a structure in which opening portions are not formed in the lower cartridge 106, and the reel gear 44, that meshes-together with the winding device 50, and the reel plate 46 are not provided at the reel 10.

The locking member 130 is described next. As shown in FIG. 9, this locking member 130 is formed in a substantial "Ω" shape in plan view, and the plural (four in the illustrated structure) tape guides 132, that are solid cylindrical and serve as temporary guides, are provided so as to project integrally at the bottom surface of a distal end portion 130B of a central portion 130A that is formed in this circular arc shape, so as to be lined-up along this circular arc shape. Further, as shown in detail in FIG. 16, lock gears 134, that mesh-together with the engaging gears 124 of the rotational position prescribing members 120, are formed at both end portions 130C of the locking member 130.

Here, this locking member 130 is mounted to the outer surface of the ceiling wall 105 of the upper cartridge 104 due to the tape guides 132 being inserted, from the exterior, through the plural long hole portions 105B that are formed in the ceiling wall 105 of the upper cartridge 104. Namely, the locking member 130, at which the tape guides 132 have been inserted through the long hole portions 105B, is slid in the arrow F direction shown in FIG. 9, FIG. 15A.

Figure 15A:
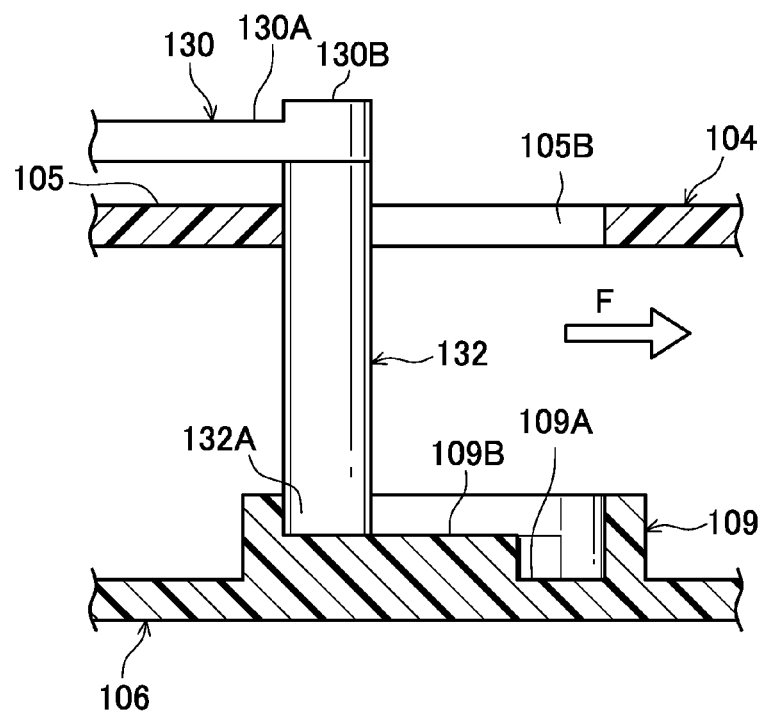
FIG. 15A is a cross-sectional view showing a lock hole that locks and a guide groove that guides a tape guide of a locking member.
Figure 15B:
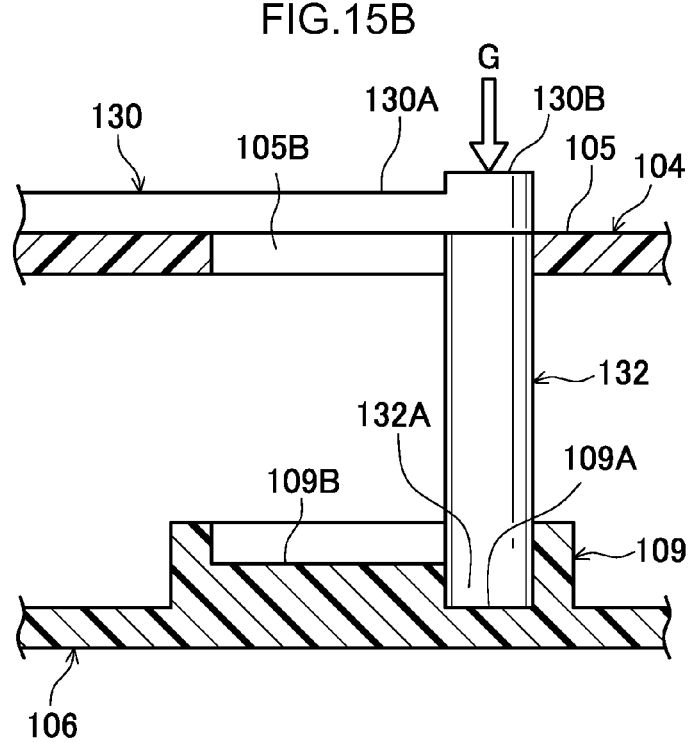
FIG. 15B is a cross-sectional view showing the lock hole that locks and the guide groove that guides the tape guide of the locking member.

Thereupon, as shown in FIG. 15A, lower end portions 132A of the tape guides 132 are guided in the arrow F direction by the guide grooves 109B, and, when these lower end portions 132A abut the distal end portions of the guide grooves 109B, the lock gears 134 mesh-together with the engaging gears 124 as shown in FIG. 16A. Further, as shown in FIG. 15B, the distal end portion 130B, that is thick-walled of the central portion 130A of the locking member 130, is pushed downward (in the arrow G direction) from above, and the lower end portions 132A of the tape guides 132 are press-fit into (fit-together with) the lock holes 109A.

Due thereto, the locking member 130 is a structure that is simply fixed and placed at the ceiling wall 105 at a locking position that locks the rotational position prescribing members 120, and is a structure in which inadvertent rotation of the respective reels 10, 20 is impeded (locked) until the magazine 100 is installed in the drive device 60. Further, as shown in FIG. 9, this is a structure in which the recording tape T, that is drawn-out from the reel 10 and is wound on the outer peripheral surface of the reel hub 22 of the reel 20, is held in a state in which tension of a given extent is applied thereto by the tape guides 132.

Note that, in order to install the reels 10, 20 within the magazine 100 into the drive device 60, at the time of releasing the locking of rotation by the locking member 130, first, the distal end portion 130B of the locking member 130 is pulled upward, and the lower end portions 132A of the tape guides 132 are taken-out from the lock holes 109A. Then, it suffices to slide the locking member 130 (the tape guides 132) along the long hole portions 105B in the direction (the arrow E direction shown in FIG. 20) that is opposite the arrow F direction shown in FIG. 9, FIG. 15A, and detach the lock gears 134 from the engaging gears 124 as shown in FIG. 16B.

Next, the method (operation) of installing the reels 10, 20 into the drive device 60 in the case of using this magazine 100 is described. The reel 10, on which the recording tape T is wound, and the reel 20, at which the free end side of the recording tape T is mounted to the reel hub 22, are held at the upper cartridge 104 by the reel holding mechanisms 90 of the second embodiment such that that falling-off is prevented and rotation is impossible (holding step). Due to the lower cartridge 106 being joined to the upper cartridge 104 by the fixing screws 37, the reel 10 and the reel 20 are housed (fixed) within the magazine 100 (the cartridge 102).

Figure 17A:
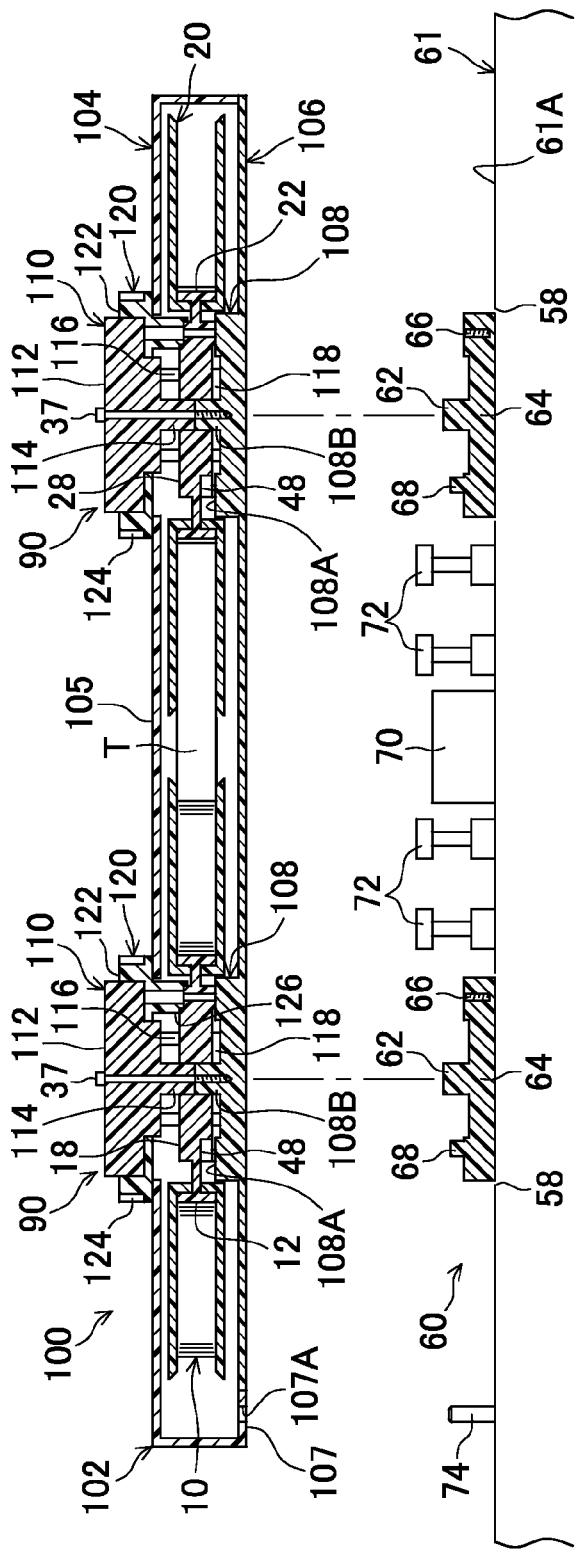
FIG. 17A is an explanatory drawing showing a step of detaching a lower cartridge of the magazine relating to the second embodiment, and installing into the drive device.
Figure 17B:
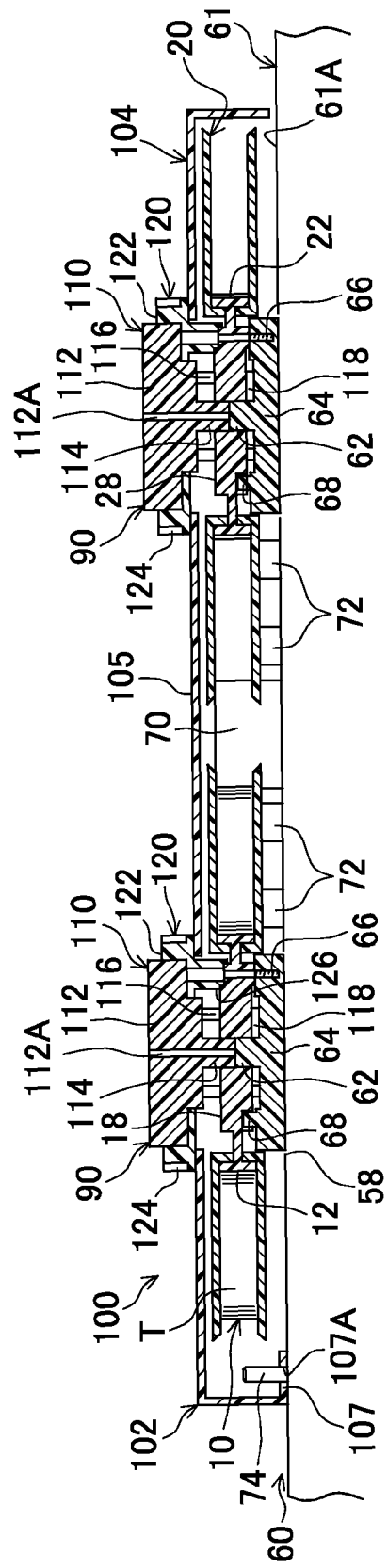
FIG. 17B is an explanatory drawing showing the step of detaching the lower cartridge of the magazine relating to the second embodiment, and installing into the drive device.

Accordingly, at the time of conveying (transporting) the magazine 100, it is difficult for edge damage to arise at the recording tape T that is wound on the reel 10. When the magazine 100 that has been conveyed (transported) in is installed into the drive device 60, first, as shown in FIG. 17A, FIG. 17B, the lower cartridge 106 is detached (detaching step). Namely, the fixing screws 37 that are screwed-together with the central positions at the main body portions 112 of the vertical position prescribing members 110 are taken-out.

Then, the distal end portion 130B side of the locking member 130 is pulled-up, and the lower end portions 132A of the tape guides 132 are taken-out from the lock holes 109A. Due thereto, the lower cartridge 106 is detached from the upper cartridge 104. Note that the fixing screws 37 may be taken-out after the lower end portions 132A of the tape guides 132 are taken-out from the lock holes 109A.

When the lower cartridge 106 is detached from the upper cartridge 104, the upper cartridge 104 is moved onto the bottom plate 61A of the housing 61, and the positioning pins 74, that are provided to project on this bottom plate 61A, are inserted through the reference holes 107A formed in the bottom surface portion 107 of the upper cartridge 104.

Due thereto, the respective reels 10, 20 are positioned with respect to the respective rotating members 64 of the drive device 60. Namely, the reinforcing portions 18, 28 of the reel hubs 12, 22 at the respective reels 10, 20 are positioned and placed on the respective rotating members 64 of the drive device 60 (placement step). This state is shown in FIG. 17B and FIG. 19.

Figure 19:
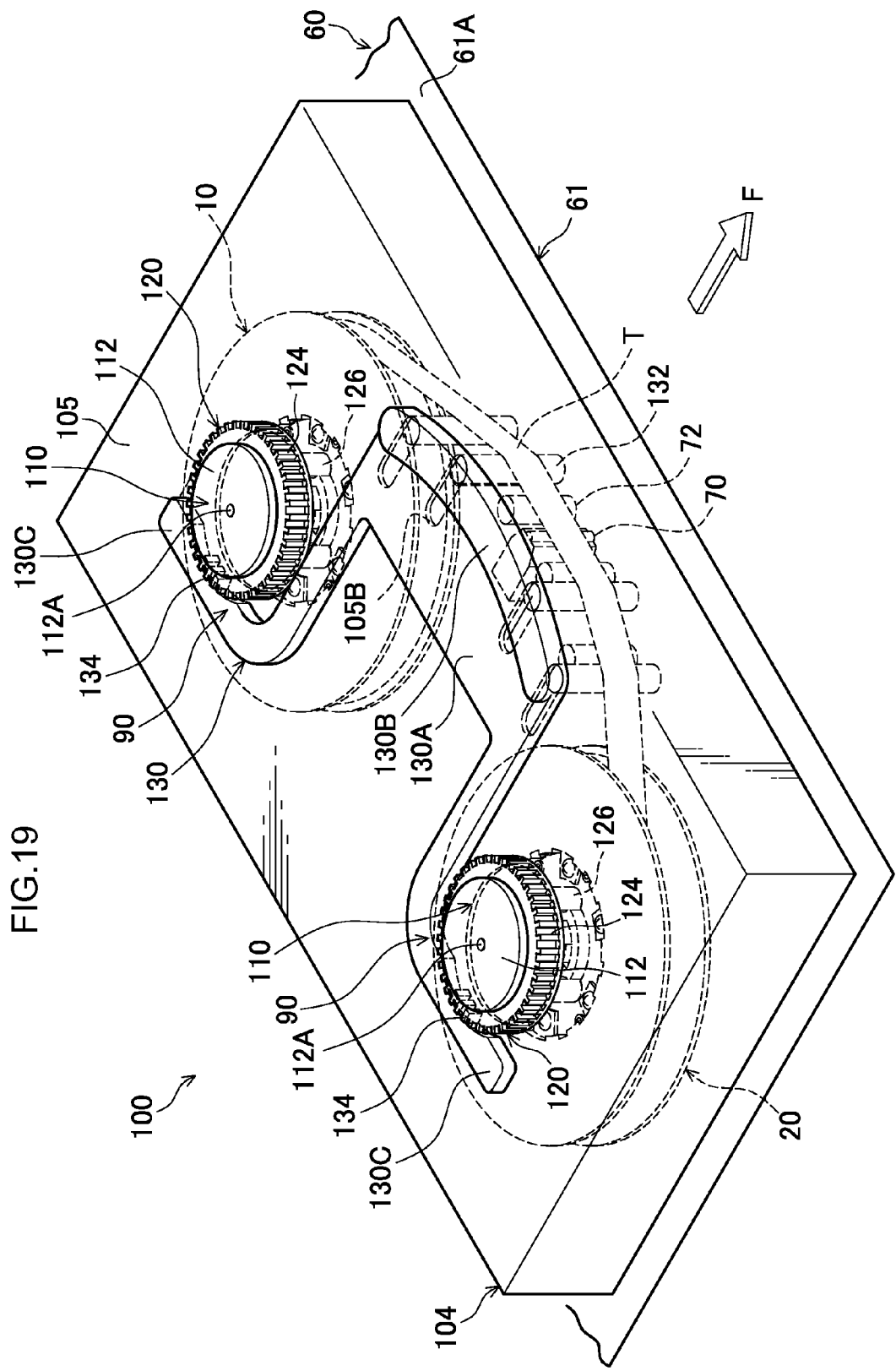
FIG. 19 is a perspective view showing the magazine relating to the second embodiment in a state in which the lower cartridge is detached and the magazine is installed in the drive device.

Note that, at this time, the tape guides 132 of the locking member 130 are disposed between the respective tape guides 72 of the drive device 60 and further at the side in the direction of moving away from the recording/playback head 70 (the arrow F direction side) than the respective tape guides 72, and therefore, do not interfere with these tape guides 72 (FIG. 19). Accordingly, positioning and placement of the upper cartridge 104, that is holding the respective reels 10, 20, onto the bottom plate 61A of the housing 61 of the drive device 60 can be accomplished easily.

Figure 20:
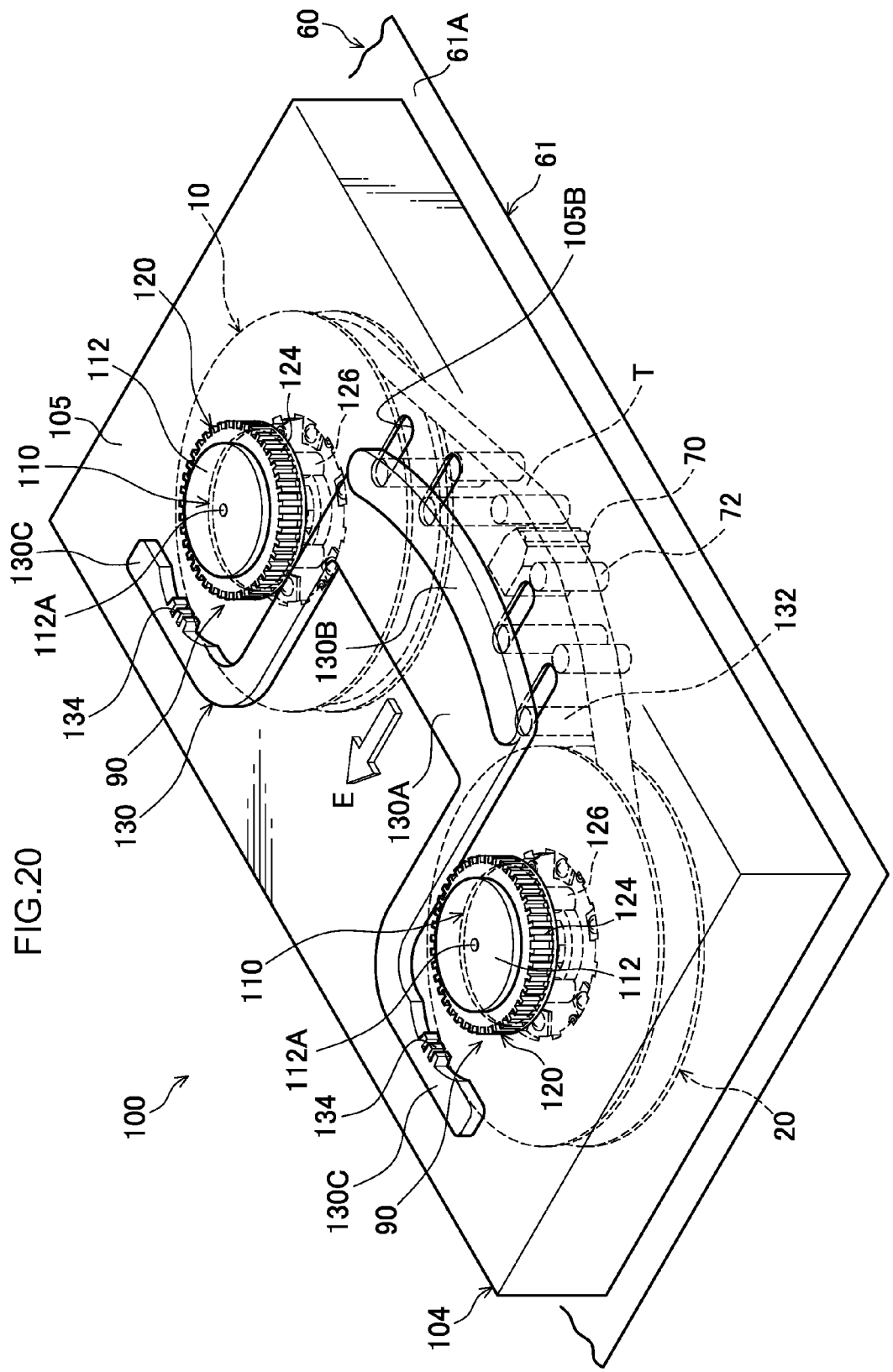
FIG. 20 is a perspective view showing the magazine relating to the second embodiment in a state in which locking of the locking member is released.

Thereafter, as shown in FIG. 20, the tape guides 132 of the locking member 130 are slid along the long hole portions 105B in the arrow E direction that is the direction opposite the arrow F direction (are withdrawn from the recording tape T). Namely, as shown in FIG. 16, the lock gears 134 of the locking member 130 are detached from the engaging gears 124 of the rotational position prescribing members 120, and locking of rotation of the rotational position prescribing members 120 is released (releasing step). Then, the locking member 130 is removed from the upper cartridge 104. Due thereto, the locking member 130 does not get in the way in the steps thereafter.

On the other hand, when the reinforcing portions 18, 28 of the respective reel hubs 12, 22 are disposed on the respective rotating members 64, the projecting shaft portions 62 of the respective rotating members 64 are inserted in the hole portions 30A of the respective reinforcing portions 18, 28 (small cylindrical tube portions 30), and the radial direction positions of the respective reel hubs 12, 22 (the reinforcing portions 18, 28) with respect to the respective rotating members 64 are positioned (centered) with good accuracy. Then, the plural (the same number as the number of screw boss portions 66) convex portions 68 of the respective rotating members 64 are fit-together with the plural (the same number as the number of screw hole portions 40) concave portions 48 that are formed in the reinforcing portions 18, 28 of the respective reel hubs 12, 22.

Accordingly, the peripheral direction positions (rotation angles) of the respective reel hubs 12, 22 (reinforcing portions 18, 28) with respect to the respective rotating members 64 are positioned with good accuracy, and the positions of the boss portions 41 (the screw hole portions 40) at the reinforcing portions 18, 28 of the respective reel hubs 12, 22, and the screw boss portions 66 at the respective rotating members 64, are made to coincide. Note that, at this time, by rotating the rotational position prescribing members 120 manually, the reels 10, 20 may be rotated slightly (the peripheral direction positions of the reels 10, 20 may be adjusted), and may be guided so as to fit the convex portions 68 together with the concave portions 48.

Namely, when the locking member 130 is removed from the upper cartridge 104, the tape guides 132 are disposed further at the side in the direction of moving away from the recording/playback head 70 (the arrow F direction side) than the tape guides 72 of the drive device 60, and therefore, the recording tape T is in a slightly slack state. Thus, the rotational position prescribing members 120 can be rotated slightly. Moreover, because the engaging gears 124 are formed at the outer peripheral portions of the rotational position prescribing members 120, when the rotational position prescribing members 120 are rotated by fingertips, it is difficult for the fingertips to slip and easy to rotate the rotational position prescribing members 120.

Further, also in cases in which the convex portions 68 can be fit-together with the concave portions 48 without rotating the reels 10, 20 slightly, the recording tape T is in a slightly slack state as described above, which therefore makes the reels 10, 20 rotate slightly and makes the recording tape T run along the tape guides 72. Due thereto, the recording tape T, that was being guided by the tape guides 132, can be smoothly transferred to the tape guides 72 (the recording tape T can be passed easily at the time of installing the respective reels 10, 20 into the drive device 60).

Figure 18A:
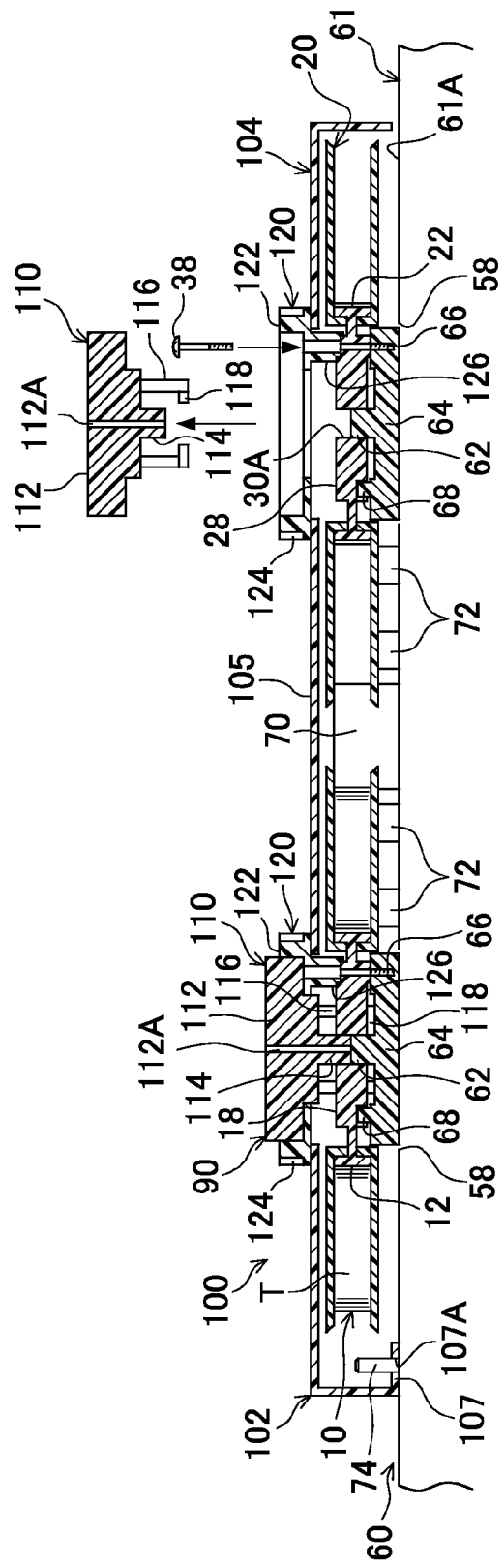
FIG. 18A is an explanatory drawing showing a step up until the magazine relating to the second embodiment is installed in the drive device and an upper cartridge is detached.
Figure 21:
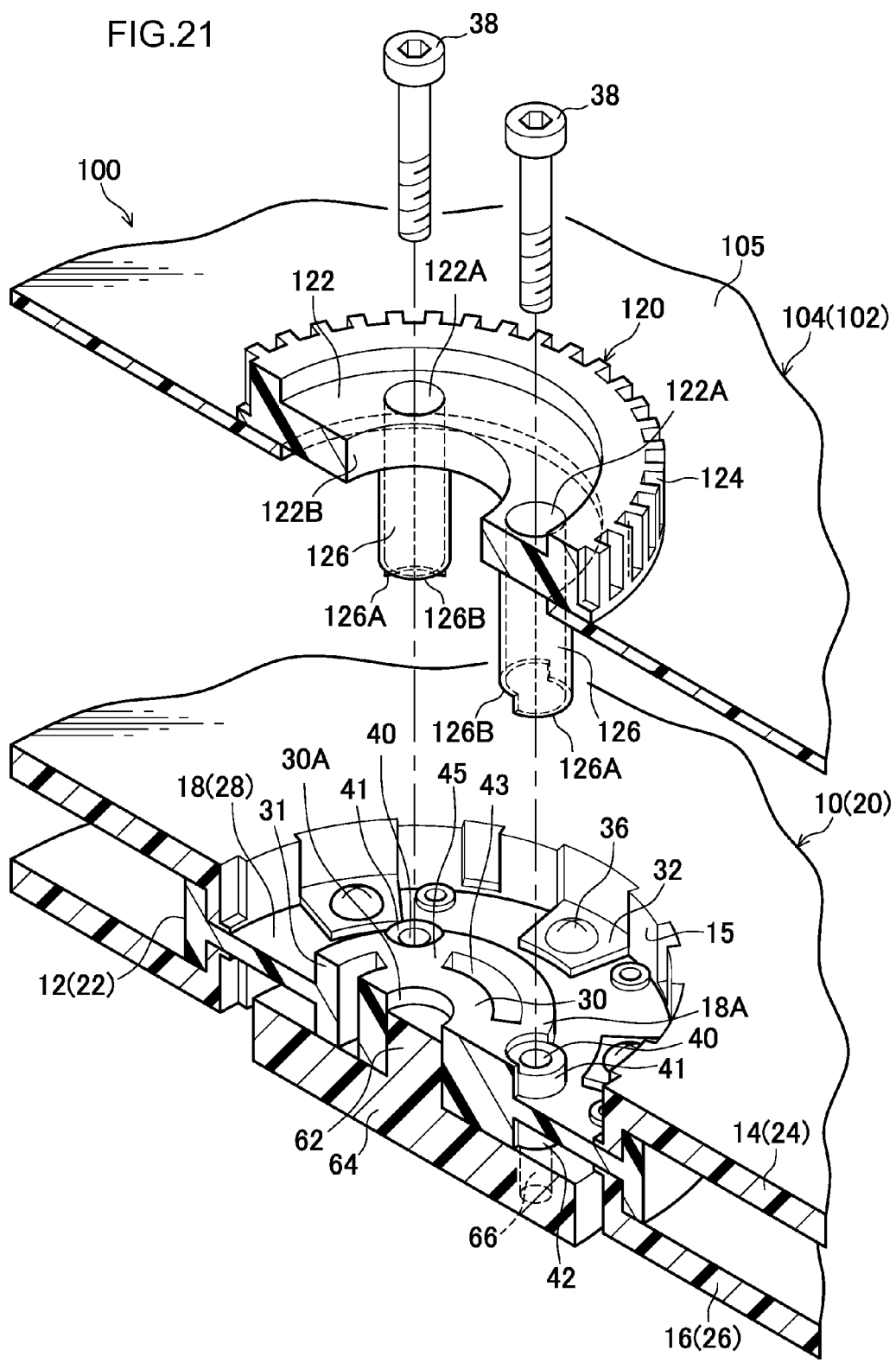
FIG. 21 is an exploded perspective view showing the rotational position prescribing member that is equipped with boss portions that guide screws for mounting the reel to the rotating member.
Figure 22:
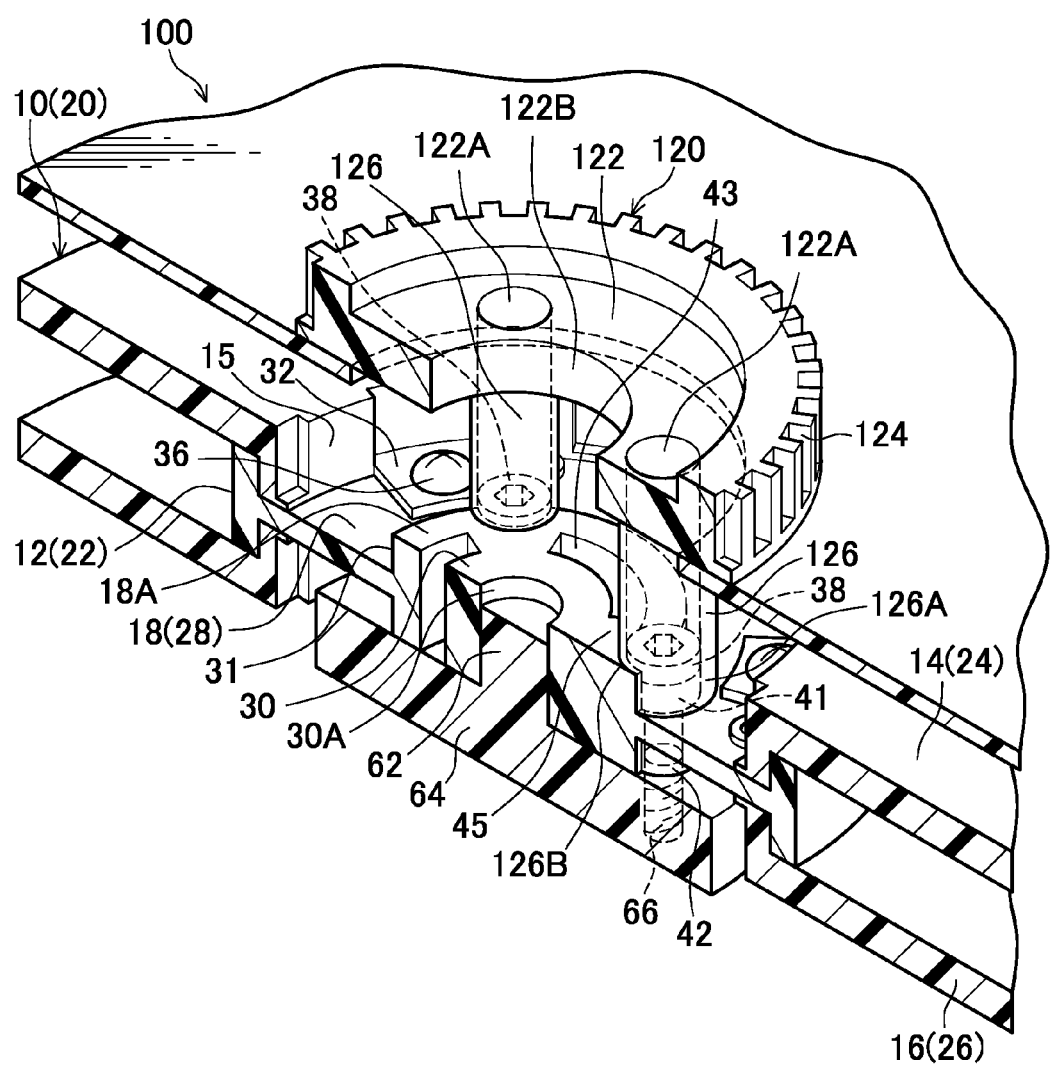
FIG. 22 is a perspective view showing a state in which the reel is mounted to the rotating member by the screws that have been guided by the boss portions of the rotational position prescribing member.

When the positions of the reinforcing portions 18, 28 of the reel hubs 12, 22 with respect to the rotating members 64 are prescribed in this way, the vertical position prescribing members 110 are rotated in the direction (the other direction) that is opposite to the arrow R direction and the anchoring of the hook portions 118 with respect to the connecting portions 45 is released (is set in a holding released state), and, as shown in FIG. 18A, these vertical position prescribing members 110 are detached from the upper cartridge 104 (the rotational position prescribing members 120) (releasing step). Then, as shown in FIG. 21, FIG. 22, the screws 38 are inserted into the screw hole portions 122A (the boss portions 126, 41) of the rotational position prescribing members 120 and are screwed-together with the screw boss portions 66.

Namely, at this time, because the boss portions 41 (screw hole portions 40), that are provided at the reinforcing portions 18, 28 of the respective reels 10, 20, and the screw boss portions 66 of the rotating members 64 communicate with one another, by screwing the respective screws 38 together with the respective screw boss portions 66 via the respective boss portions 41, the reinforcing portion 18 of the reel hub 12 can be fixed to the one (the first) rotating member 64, and the reinforcing portion 28 of the reel hub 22 can be fixed to the other (the second) rotating member 64 (fixing step).

Further, at this time, because the boss portions 126 of the rotational position prescribing members 120 are guide portions of the screws 38 into the boss portions 41 (the screw hole portions 40) and the screw boss portions 66, the screws 38 are easy to mount. Note that the shape of the screws 38 may be the shape shown in FIG. 18A, or may be the shape shown in FIG. 21, FIG. 22.

Further, at this time, because the projecting portions 42, that are formed at the bottom surfaces of the reinforcing portions 18, 28 of the respective reel hubs 12, 22, abut the top surfaces of the rotating members 64, the height (axial) direction positions of the respective reels 10, 20 (the reinforcing portions 18, 28 of the respective reel hubs 12, 22) are positioned and fixed with good accuracy with respect to the respective rotating members 64.

Figure 18B:
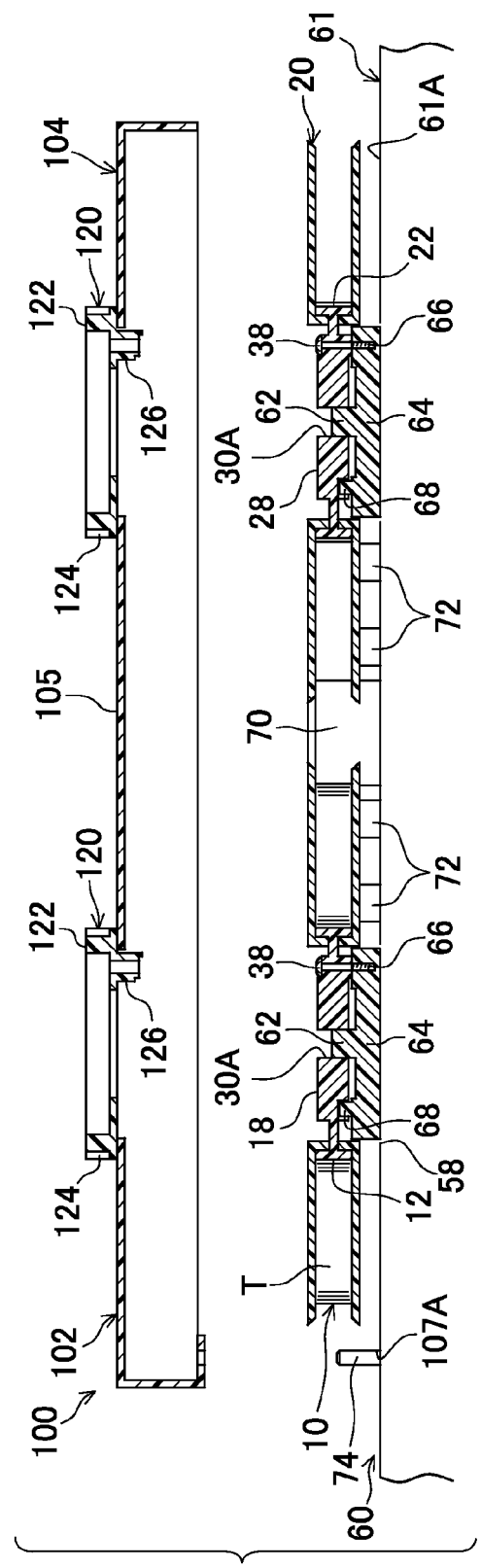
FIG. 18B is an explanatory drawing showing the step up until the magazine relating to the second embodiment is installed in the drive device and the upper cartridge is detached.

When the reinforcing portions 18, 28 of the respective reels 10, 20 are fixed to the respective rotating members 64 in this way, as shown in FIG. 18B, the rotational position prescribing members 120 and the upper cartridge 104 are removed from within the housing 61 (from on the bottom plate 61A) of the drive device 60 (removing step). Note that the screws 38 may be screwed-together with the screw boss portions 66 after the rotational position prescribing members 120 and the upper cartridge 104 are removed from within the housing 61 (from on the bottom plate 61A).

In this way, in accordance with the method of installing the reels 10, 20 using the magazine 100 relating to the second embodiment, the respective reels 10, 20 are installed into the housing 61 of the drive device 60 in a state of being held by the upper cartridge 104 of the magazine 100, and therefore, the ability to install the pair of reels 10, 20 is excellent. Moreover, because this cartridge 102 and rotational position prescribing members 120 and the like can be reused, it is preferable for the environment as well.

Figure 23:
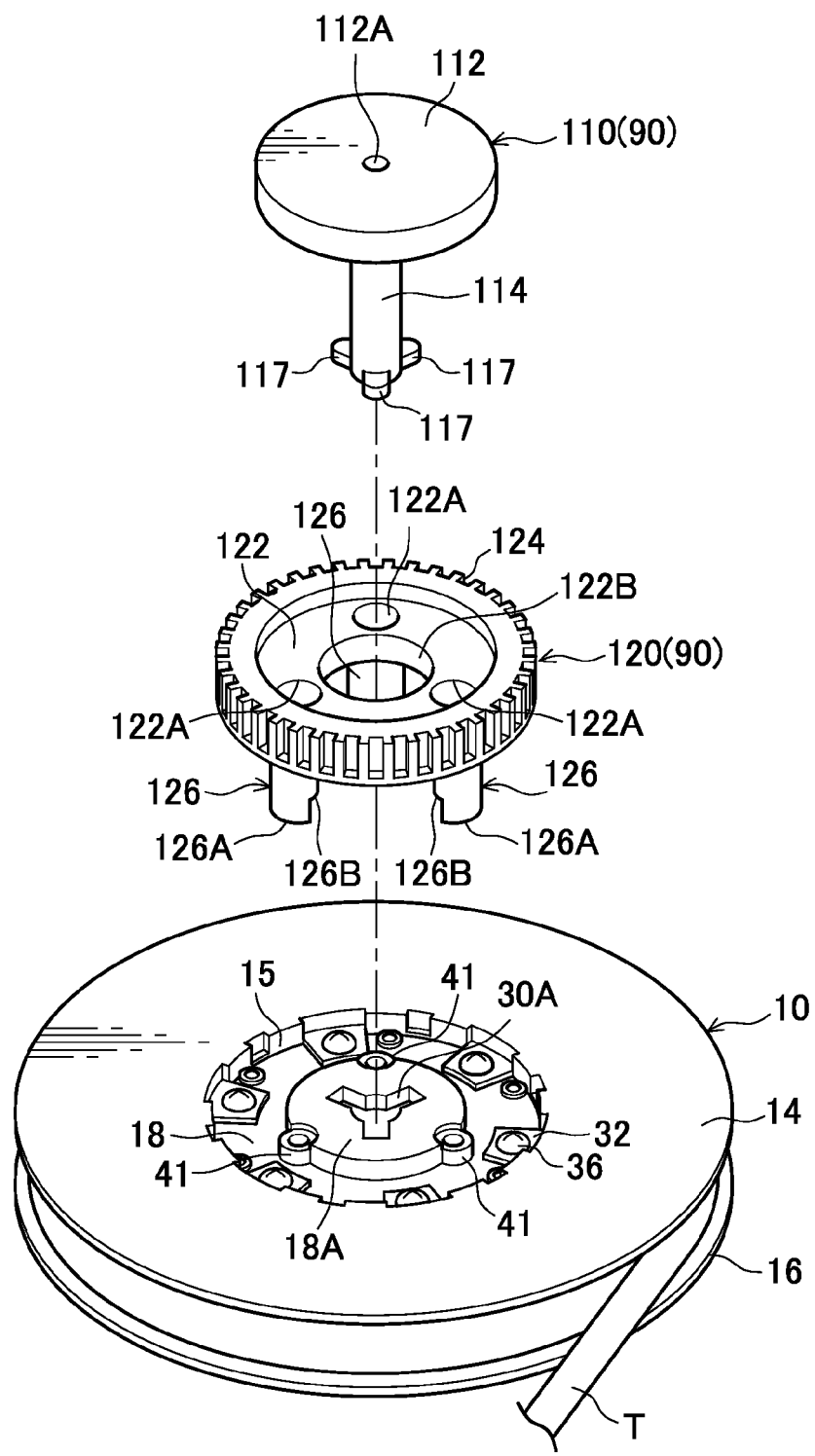
FIG. 23 is an exploded perspective view showing, in an enlarged manner, a vertical position prescribing member and a rotational position prescribing member relating to a modified example of the magazine relating to the second embodiment.
Figure 24A:
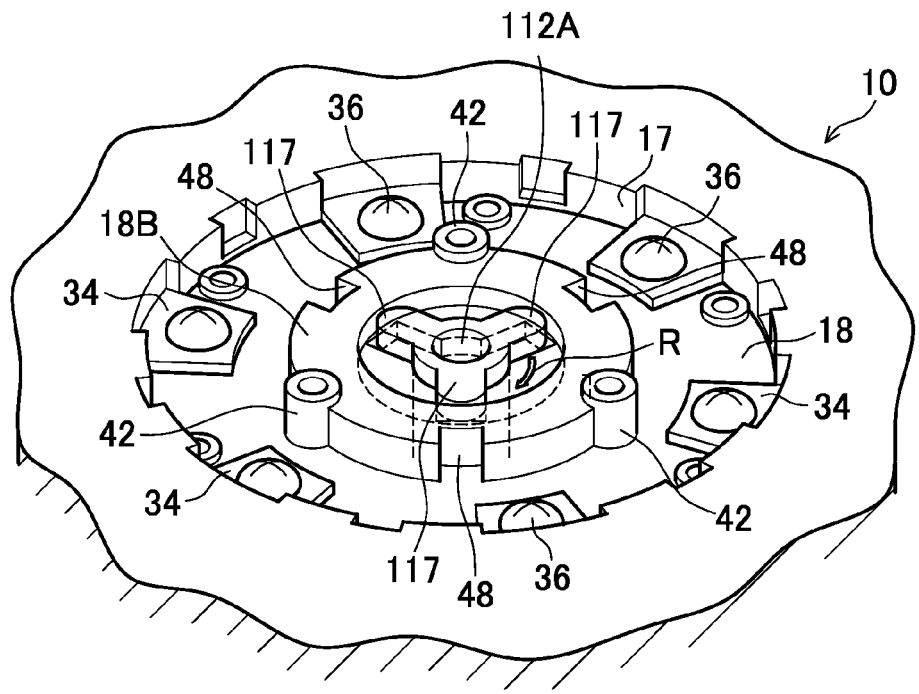
FIG. 24A is a perspective view showing a mounting structure of the vertical position prescribing member shown in FIG. 23.
Figure 24B:
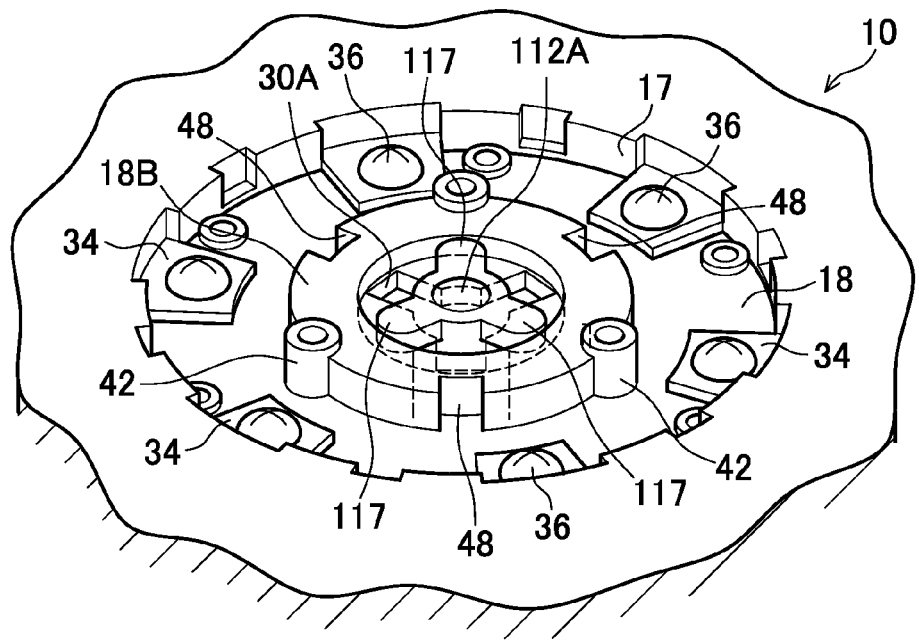
FIG. 24B is a perspective view showing the mounting structure of the vertical position prescribing member shown in FIG. 23.

Finally, modified examples of the vertical position prescribing members 110 at the magazine 100 relating to the second embodiment are described. As shown in FIG. 23, FIG. 24, the vertical position prescribing member 110 is structured such that three hook portions 117 are provided integrally at uniform intervals at the lower end portion of the boss portion 114, so as to project toward the radial direction outer side. Note that the projecting lengths of the hook portions 117 are shorter than the radius of the through-hole 122B of the rotational position prescribing member 120.

Further, the hole portion 30A, that corresponds to the shape of the boss portion 114 at which these hook portions 117 are provided to project, is formed in the respective reinforcing portions 18, 28 at the respective reels 10, 20. Accordingly, there is a structure in which the hook portions 117 and the boss portion 114 are inserted through the hole portion 30A, and thereafter, as shown in FIG. 24, by rotating the vertical position prescribing member 110 approximately 60° in the peripheral direction (e.g., the arrow R direction), these hook portions 117 are anchored simply on the bottom surface of the reinforcing portion 18, 28.

Even with this vertical position prescribing member 110, at the magazine 100 (the cartridge 102) interior, the respective reels 10, 20 are held at the ceiling wall 105 of the upper cartridge 104 in states in which the positions in the vertical direction are prescribed, such that the respective upper flanges 14, 24 do not contact the inner surface of the ceiling wall 105 of the upper cartridge 104 and the respective lower flanges 16, 26 do not contact the inner surface of the lower cartridge 106. Further, in accordance with the vertical position prescribing member 110 of such a structure, there is the advantage that the rotation directions of anchoring and releasing the anchoring of the hook portions 117 may be either of the arrow R direction and the direction opposite thereto.

Figure 25:
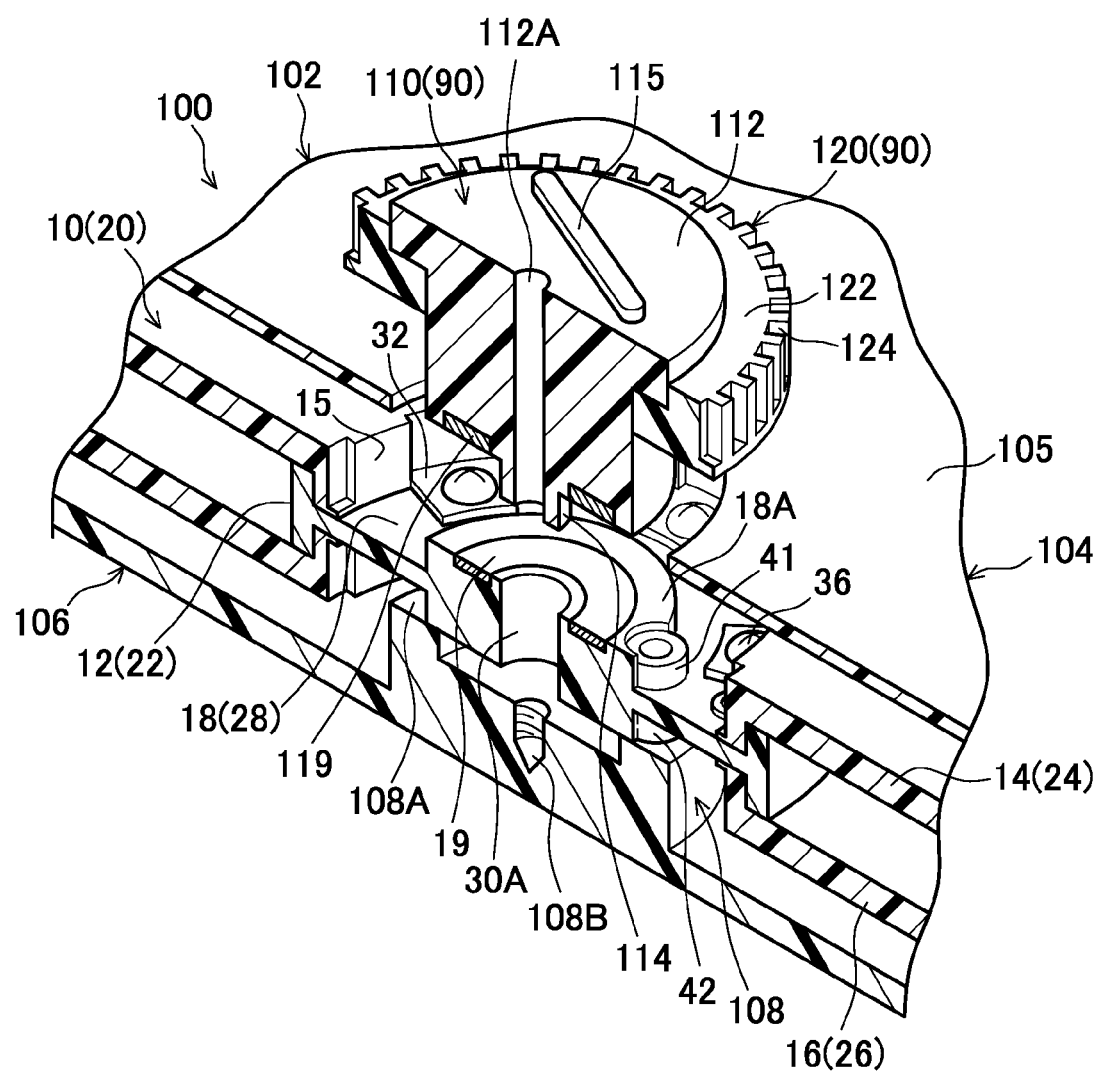
FIG. 25 is a perspective sectional view showing a vertical position prescribing member relating to a modified example of the magazine relating to the second embodiment.

Further, as shown in FIG. 25, the vertical position prescribing members 110 may be structures that prescribe the vertical direction positions of the reels 10, 20 by the ON/OFF of magnetic force. Namely, there may be a structure in which, by the switching operation of switching levers 115, annular magnetic bodies 119 that are provided at the bottom surfaces of the vertical position prescribing members 110 are made to generate magnetic force, and, by attracting magnetic metal plates 19 that are annular and are provided at the top surfaces of the reinforcing portions 18, 28 of the respective reels 10, 20, the respective reels 10, 20 are held at the upper cartridge 104.

Note that a structure that uses a known magnet stand or the like for example can be applied as the structure that turns the magnetic force of the magnetic body 119 ON/OFF by the switching operation (rotating operation) of the switching lever 115. Further, the recording tape T is not affected by the magnetic fields generated by the magnetic bodies 119 provided at these vertical position prescribing members 110.

Methods of installing the reels 10, 20, and the magazines 80, 100, relating to the present embodiments have been described above on the basis of the drawings, but the methods of installing the reels 10, 20, and the magazines 80, 100, relating to the present embodiments are not limited to the illustrated structures, and the designs thereof can be changed appropriately within a scope that does not deviate from the gist of the present invention. For example, the reels 10, 20 may be housed (held) within the magazine 80, 100 in states in which the recording tapes T are wound thereon respectively and these are not connected.

Further, in the present embodiments, the lower cartridges 84, 106 are not limited to structures that are completely detached from the upper cartridges 82, 104, and may be structures that are slid and are housed within the upper cartridges 82, 104, or the like. Further, the tape guides 88, 132 that serve as the temporary guides are not limited to structures in which a plurality of the tape guides that are solid cylindrical are provided, and, for example, may be structures in which plural (or one) wall shaped (plate shaped) tape guides that are formed in substantial circular arc shapes in plan view are provided, or the like.

Further, the concave portions 48 may be formed at the rotating members 64, and the convex portions 68 may be formed at the reinforcing portions 18, 28 of the respective reel hubs 12, 22, and positioning in the peripheral direction carried out (the positions of the screw hole portions 40 and the screw boss portions 66 made to coincide). Further, the numbers of the concave portions 48 (the convex portions 68) and the screw hole portions 40 (the screw boss portions 66) are not limited to three. Moreover, the projecting portions 42 are not limited to portions that are formed at the bottom surfaces of the screw hole portions 40 coaxially therewith, and may be formed on a concentric circumference that is different than the screw hole portions 40 of the bottom surfaces of the reinforcing portions 18, 28.

Further, in the present embodiments, the engaged portions are not limited to the illustrated reference holes 87A, 107A, and the engaging portions also are not limited to the illustrated positioning pins 74. For example, the plate thickness of one of the side walls 86 may be made to be thicker than the diameter of the positioning pins 74, and the reference holes 87A in the first embodiment may be formed at the bottom surface portion (a portion of the bottom wall) of this side wall 86. Further, what is formed at the central portions of the reinforcing portions 18, 28 of the respective reel hubs 12, 22 (the rotation central portion of the reel 10) in the first embodiment is not limited to the hole portions 30A (the small cylindrical tube portions 30), and may be concave portions (not shown).

Further, the disclosures of Japanese Patent Application No. 2010-172793 and Japanese Patent Application No. 2011-46699 are incorporated by reference into the present Description in their entireties. All documents, patent applications, and technical standards mentioned in the present Description are incorporated by reference into the present Description to the same extent as if such individual document, patent application, or technical standard was specifically and individually indicated to be incorporated by reference.

What is claimed is:

1. A reel installation method for installing a first reel and a second reel into a drive device from a magazine that is formed from an upper cartridge and a lower cartridge that is detachable from the upper cartridge, that houses the first reel and the second reel that each have a reel hub, and that houses a recording tape that is wound on an outer peripheral surface of at least one reel hub of the first reel or the second reel, the method comprising:

(A) holding the reel hub of the first reel and the reel hub of the second reel at the upper cartridge so as to be unable to rotate, by reel holding mechanisms that are provided at the upper cartridge;

(B) detaching the lower cartridge from the upper cartridge;

(C) conveying the upper cartridge, that is in a state of holding the respective reel hubs of the first reel and the second reel by the reel holding mechanisms, to the drive device, and positioning and placing the reel hub of the first reel and the reel hub of the second reel respectively on a pair of rotating members of the drive device;

(D) releasing holding of the respective reel hubs of the first reel and the second reel by the reel holding mechanisms;

(E) removing the upper cartridge from the drive device; and (F) fixing the respective reel hubs of the first reel and the second reel to the respective rotating members of the drive device.

2. The reel installation method of claim 1, wherein, at a time of (C) conveying the upper cartridge, that is in a state of holding the respective reel hubs of the first reel and the second reel by the reel holding mechanisms, to the drive device, and positioning and placing the reel hub of the first reel and the reel hub of the second reel respectively on the pair of rotating members of the drive device, engaging portions of the drive device are made to engage with engaged portions that are formed at the upper cartridge.

3. The reel installation method of claim 1, wherein the recording tape is guided by temporary guides that are provided at the upper cartridge, and, at a time of (C) conveying the upper cartridge, that is in a state of holding the respective reel hubs of the first reel and the second reel by the reel holding mechanisms, to the drive device, and positioning and placing the reel hub of the first reel and the reel hub of the second reel respectively on the pair of rotating members of the drive device or (D) releasing holding of the respective reel hubs of the first reel and the second reel by the reel holding mechanisms, the recording tape, that is guided by the temporary guides, is transferred to actual guides of the drive device.

4. The reel installation method of claim 1, wherein flanges are provided respectively at both end portions of the reel hub of the first reel and both end portions of the reel hub of the second reel, and, when the first reel and the second reel are housed in the magazine, at least the flanges do not contact inner surfaces of the magazine.

\* \* \* \* \*